United States Patent
Lund et al.

(10) Patent No.: US 11,222,542 B2
(45) Date of Patent: Jan. 11, 2022

(54) PLANNING AND CONTROL FRAMEWORK WITH COMMUNICATION MESSAGING

(71) Applicant: QUALCOMM Incorporated, San Diego, CA (US)

(72) Inventors: Benjamin Lund, Escondido, CA (US); Edwin Chongwoo Park, San Diego, CA (US); Anthony Blow, San Diego, CA (US); Garrett Shriver, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 16/547,901

(22) Filed: Aug. 22, 2019

(65) Prior Publication Data

US 2021/0056852 A1    Feb. 25, 2021

(51) Int. Cl.
| | |
|---|---|
| *G08G 1/16* | (2006.01) |
| *H04W 4/44* | (2018.01) |
| *G06K 9/00* | (2006.01) |
| *G08G 1/005* | (2006.01) |
| *G08G 1/04* | (2006.01) |

(52) U.S. Cl.
CPC ......... *G08G 1/166* (2013.01); *G06K 9/00771* (2013.01); *G08G 1/005* (2013.01); *G08G 1/04* (2013.01); *H04W 4/44* (2018.02)

(58) Field of Classification Search
CPC .......... G08G 1/166; G08G 1/005; G08G 1/04; G08G 1/096791; G08G 1/096827; G08G 1/096725; G08G 1/096783; G06K 9/00771; H04W 4/44
See application file for complete search history.

(56) References Cited

U.S. PATENT DOCUMENTS

| | | | | |
|---|---|---|---|---|
| 10,106,083 | B1 * | 10/2018 | Fields | ............... G08G 1/096725 |
| 2010/0070145 | A1 * | 3/2010 | Foster | .................. G05D 1/0278 |
| | | | | 701/50 |
| 2015/0079946 | A1 * | 3/2015 | Won | .................... H04W 68/005 |
| | | | | 455/412.2 |
| 2017/0268896 | A1 | 9/2017 | Bai et al. | |
| 2018/0068358 | A1 | 3/2018 | Hoffberg | |

(Continued)

OTHER PUBLICATIONS

International Search Report and Written Opinion—PCT/US2020/047421—ISA/EPO—dated Dec. 3, 2020.

*Primary Examiner* — Omeed Alizada
(74) *Attorney, Agent, or Firm* — Qualcomm Incorporated

(57) ABSTRACT

Disclosed is a method and apparatus for operating a first device. The first device obtains environment information in proximity to the first device and receives one or more communication messages from a second device and the message(s) includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The first device determines whether the one or more communication messages are relevant to the first device based on the relevance criteria and the environment information and performs an operation in response to the determination of whether the one or more communication messages are relevant.

28 Claims, 9 Drawing Sheets

(56) References Cited

U.S. PATENT DOCUMENTS

| | | |
|---|---|---|
| 2018/0136008 A1 | 5/2018 | Engel et al. |
| 2018/0156624 A1* | 6/2018 | Bai ....................... G08G 1/162 |
| 2019/0184893 A1* | 6/2019 | Sorokin ................ B60Q 1/503 |

* cited by examiner

500

510 — Identifying one or more vehicle platoons

520 — Transmitting one or more requests to join the identified one or more vehicle platoons 530 — Receive one or more responses to the one or more requests 540 — Performing one or more actions based on the received one or more responses

FIG. 5

PLANNING AND CONTROL FRAMEWORK WITH COMMUNICATION MESSAGING

FIELD

This disclosure relates generally to methods, devices, and computer readable medium for communication and/or messaging between different devices (e.g. vehicles, infrastructure, etc.), including determining relevance of messaging, validating messaging, etc.

BACKGROUND

Advanced driver assistance autonomous systems (ADAS) may be partially autonomous, fully autonomous or capable of providing assistance to a driver of a vehicle. Current ADAS have cameras and ultrasound sensors, and some include one or more radars. However, these current systems operate independent of other nearby vehicles and each perform redundant operations.

In some messaging systems, such as dedicated short-range communications (DSRC), any messaging received is assumed to be relevant to the receiving device so there may be wasted resources by the receiving device by processing the message and determining how it applies to the device. Additionally, messages are assumed to be valid and not spoofed, and using similar communication encryption techniques without validating the information provided by a device within the system, which may result in vehicle collisions or inefficient or unsafe movements by these vehicles.

SUMMARY

An example of a method to determine whether one or more communication messages are relevant to a first device. The method obtains environment information in proximity to the first device and receives one or more communication messages from a second device and the message(s) includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The method determines whether the one or more communication messages are relevant to the first device based on the relevance criteria and the environment information and performs an operation in response to the determination of whether the one or more communication messages are relevant.

An example of a device to determine whether one or more communication messages are relevant to a first device may include one or more memory, one or more transceivers and one or more processors communicatively coupled to the one or more memory and the one or more transceivers. The processors configured to obtain environment information in proximity to the first device, and receives, via the one or more transceivers, one or more communication messages from a second device and the message(s) includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The processors are configured to determine whether the one or more communication messages are relevant to the first device based on the relevance criteria and the environment information and perform an operation in response to the determination of whether the one or more communication messages are relevant.

An example of a device for determining whether one or more communication messages are relevant to a first device. The device comprises means for obtaining environment information in proximity to the first device and means for receiving one or more communication messages from a second device and the message(s) includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The device comprises means for determining whether the one or more communication messages are relevant to the first device based on the relevance criteria and the environment information and means for performing an operation in response to the determination of whether the one or more communication messages are relevant.

An example non-transitory computer-readable medium for determining whether one or more communication messages are relevant to a first device includes processor-readable instructions configured to cause one or more processors to obtain environment information in proximity to the first device, and receive one or more communication messages from a second device and the message(s) includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The non-transitory computer-readable medium configured to cause one or more processors to determine whether the one or more communication messages are relevant to the first device based on the relevance criteria and the environment information and perform an operation in response to the determination of whether the one or more communication messages are relevant.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 5 is an example process diagram illustrating vehicle platoon negotiation.

DETAILED DESCRIPTION

Figure 1:
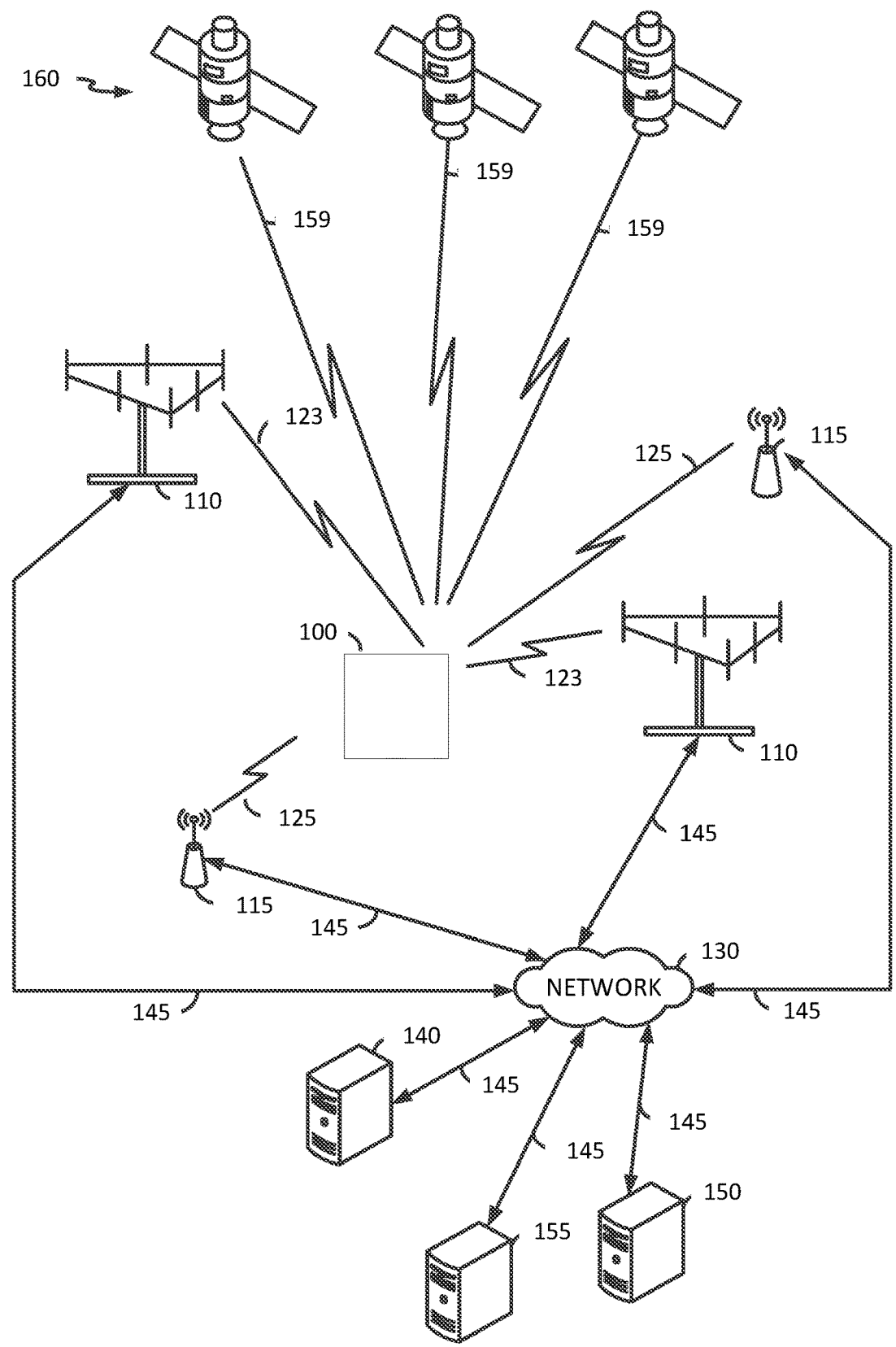
FIG. 1 shows an example of a communication environment in which various aspects of the disclosure may be implemented.

The features and advantages of the disclosed method and apparatus will become more apparent to those skilled in the art after considering the following detailed description in connection with the accompanying drawing.

References throughout this specification to one implementation, an implementation, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Additionally, figures and descriptions of the figures may indicate roads that may have right side driving and/or structured lane markings; however, these are merely examples and the disclosure is also applicable to left side driving, unstructured roads/lanes, etc.

The term "quasi-periodic" refers to an event that occurs periodically with a frequency that may change from time to time, and/or to an event occurs from time to time with no well-defined frequency.

A mobile device (e.g. mobile device 100 in FIG. 1) may be referred to as a device, a wireless device, a mobile terminal, a terminal, a mobile station (MS), a user equipment (UE), a secure user-plane location (SUPL) Enabled Terminal (SET) or by some other name and may correspond to or implemented in a movable/portable entity/device. A movable/portable device/entity may be a cellphone, smartphone, laptop, tablet, PDA, tracking device, transport vehicle, robotic device (e.g. aerial drone, land drone, etc.) or some other portable or movable device. The transport vehicle may be an automobile, motorcycle, airplane, train, bicycle, truck, rickshaw, etc. The movable/portable device/entity may operate behalf of a transport vehicle during periods when the portable device is collocated with the transport vehicle. For example, a smart phone may be used to communicate on behalf of a transport vehicle while the two are temporally co-located (this may be in conjunction with an on-board device of the transport vehicle but is not required). A device (e.g. network entity) may be a stationary device, such as a road side unit (RSU), traffic light, etc. Typically, though not necessarily, a mobile device may support wireless communication technologies and protocols such as GSM, WCDMA, LTE, CDMA, HRPD, WiFi, BT, WiMax, WiFi Direct, LTE Direct, and 5G, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

A subject device is an observed or measured device, or a device that is in proximity with an ego device.

An ego device is a device that observes or measures information related to its environment, including information corresponding to a nearby subject device. For example, an ego vehicle may obtain image data from its cameras and perform computer vision operations based on this data to determine information, such as position of another device or vehicle (e.g. subject device) relative to the ego device.

Managed (or Infrastructure) communication means point-to-point communication from a client device to a remote base station and/or other network entities, such as vehicle to infrastructure (V2I) but does not include vehicle to vehicle. The remote base station and/or other network entities may be the end destination, or the end destination may be another mobile device that is connected to the same or different remote base station. Managed communication may also include cellular based private networks.

Unmanaged, ad-hoc, or Peer-to-peer (P2P) communication means client devices may communicate directly (with each other or may hop through one or more other client devices without communicating through a network entity (e.g. network infrastructure such as an eNodeB or gNodeB, etc.) for vehicle communication, such as vehicle to vehicle (V2V) and V2I. Unmanaged communication may include ad-hoc network that are cellular based, such as LTE-direct.

In one embodiment, there may be a hybrid managed communication where at least part of the communications is managed communications and another part of unmanaged communications. For example, a device may receive control information from a managed network that provides control information (e.g. scheduling, etc) for the unmanaged communications, but other control information and data information may be handled via the unmanaged network.

According to aspects of the disclosure, a device may have managed communication capabilities and peer-to-peer communication capabilities for short range communication, such as Bluetooth® or Wi-Fi Direct, but a device may have P2P but it does not mean the device has unmanaged communication capabilities, such as V2V or V2X.

V2V messaging, V2I messaging, P2P messaging, etc. may include point-to-point messaging and/or broadcast/multicast messaging. Point-to-point messaging involves communicating with a particular device (e.g. usually a single device). Broadcast/multicast messaging involves providing a message to the devices in proximity of the broadcasting device (either omnidirectional or in a particular direction from the ego device). Managed communications, Unmanaged communication or a hybrid managed communication may be point-to-point messaging or broadcast/multicast messaging.

A trip session may be from when a vehicle is turned on to when a vehicle is turned off. In one embodiment, a trip session may be until a vehicle has reached a destination. In one embodiment, a trip session may be defined by an application, such as Uber® or Lyft®, so each ride provided to one or more passengers may be considered a trip session.

System and techniques herein provide for communication and/or messaging between devices and validation of the communication and/or messaging between devices.

As shown in FIG. 1 in a particular implementation, mobile device 100, which may also be referred to as a UE (or user equipment), may transmit radio signals to, and receive radio signals from, a wireless communication network. In one example, mobile device 100 may communicate with a cellular communication network by transmitting wireless signals to or receiving wireless signals from a cellular transceiver 110 which may comprise a wireless base transceiver subsystem (BTS), a Node B or an evolved NodeB (eNodeB) (for 5G this would be a 5G NR base station (gNodeB)) over wireless communication link 123. Similarly, mobile device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course, these are merely examples of networks that may communicate with a mobile device over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD). GSM, WCDMA, LTE, and 5G NR are technologies defined by 3GPP. CDMA and HRPD are technologies defined by the 3$^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth (BT) and LTE.

In some embodiments, system may use, for example, a Vehicle-to-Everything (V2X) communication standard, in which information may be passed between a device and other entities coupled to a communication network 110, which may include wireless communication subnets. V2X services may include, for example, one or more of services for: Vehicle-to-Vehicle (V2V) communications (e.g. between vehicles via a direct communication interface such as Proximity-based Services (ProSe) Direction Communication (PC5) and/or Dedicated Short Range Communications (DSRC)) (which is considered unmanaged communication), Vehicle-to-Pedestrian (V2P) communications (e.g. between a vehicle and a User Equipment (UE) such as a mobile device) (which is considered unmanaged communication), Vehicle-to-Infrastructure (V2I) communications (e.g. between a vehicle and a base station (BS) or between a vehicle and a roadside unit (RSU)) (which is considered managed communication), and/or Vehicle-to-Network (V2N) communications (e.g. between a vehicle and an application server) (which is considered managed communication). V2X includes various modes of operation for V2X services as defined in Third Generation Partnership Project (3GPP) TS 23.285. One mode of operation may use direct wireless communications between V2X entities when the V2X entities are within range of each other. Another mode of operation may use network based wireless communication between entities. The modes of operation above may be combined or other modes of operation may be used if desired. It is important to note that this may also at least partially be a proprietary standard, a different standard or any combination thereof.

The V2X standard may be viewed as facilitating advanced driver assistance systems (ADAS), which also includes fully autonomous vehicles, other levels of vehicle automation (e.g. Level 2, Level 3, Level 4, Level 5), or automation and coordination not currently defined in autonomous vehicle automation levels. Depending on capabilities, an ADAS may make driving decisions (e.g. navigation, lane changes, determining safe distances between vehicles, cruising/overtaking speed, braking, parking, platooning, etc.) and/or provide drivers with actionable information to facilitate driver decision making. In some embodiments, V2X may use low latency communications thereby facilitating real time or near real time information exchange and precise positioning. As one example, positioning techniques, such as one or more of: Satellite Positioning System (SPS) based techniques (e.g. based on space vehicles 160) and/or cellular based positioning techniques such as time of arrival (TOA), time difference of arrival (TDOA) or observed time difference of arrival (OTDOA), may be enhanced using V2X assistance information. V2X communications may thus help in achieving and providing a high degree of safety for moving vehicles, pedestrians, etc.

In a particular implementation, cellular transceiver 110 and/or local transceiver 115 may communicate with servers 140, 150 and/or 155 over a network 130 through links 145. Here, network 130 may comprise any combination of wired or wireless links and may include cellular transceiver 110 and/or local transceiver 115 and/or servers 140, 150 and 155. In a particular implementation, network 130 may comprise Internet Protocol (IP) or other infrastructure capable of facilitating communication between mobile device 100 and servers 140, 150 or 155 through local transceiver 115 or cellular transceiver 110. Network 130 may also facilitate communication between mobile device 100, servers 140, 150 and/or 155 and a public safety answering point (PSAP) 160, for example through communications link 165). In an implementation, network 130 may comprise cellular communication network infrastructure such as, for example, a base station controller or packet based or circuit-based switching center (not shown) to facilitate mobile cellular communication with mobile device 100. In a particular implementation, network 130 may comprise local area network (LAN) elements such as WLAN APs, routers and bridges and may in that case include or have links to gateway elements that provide access to wide area networks such as the Internet. In other implementations, network 130 may comprise a LAN and may or may not have access to a wide area network but may not provide any such access (if supported) to mobile device 100. In some implementations network 130 may comprise multiple networks (e.g., one or more wireless networks and/or the Internet). In one embodiment, network 130 may include one or more serving gateways or Packet Data Network gateways. In addition, one or more of servers 140, 150 and 155 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) in network 130.

In particular implementations, and as discussed below, mobile device 100 may have circuitry and processing resources capable of obtaining location related measurements (e.g. for signals received from GPS or other Satellite Positioning System (SPS) satellites 114, cellular transceiver 110 or local transceiver 115 and computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 140, 150 and 155) after which the location server may estimate or determine a location for mobile device 100 based on the measurements. In the presently illustrated example, location related measurements obtained by mobile device 100 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 155 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, servers 140, 150 or 155 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 110 and/or local transceiver 115 and/or may obtain a round trip signal propagation time (RTT) between mobile device 100 and a cellular transceiver 110 or local transceiver 115. A mobile device 100 may use these measurements together with assistance data (e.g. terrestrial almanac data or GNSS satellite data such as GNSS Almanac and/or GNSS Ephemeris information) received from a server 140, 150 or 155 to determine a location for mobile device 100 or may transfer the measurements to a server 140, 150 or 155 to perform the same determination.

Figure 2:
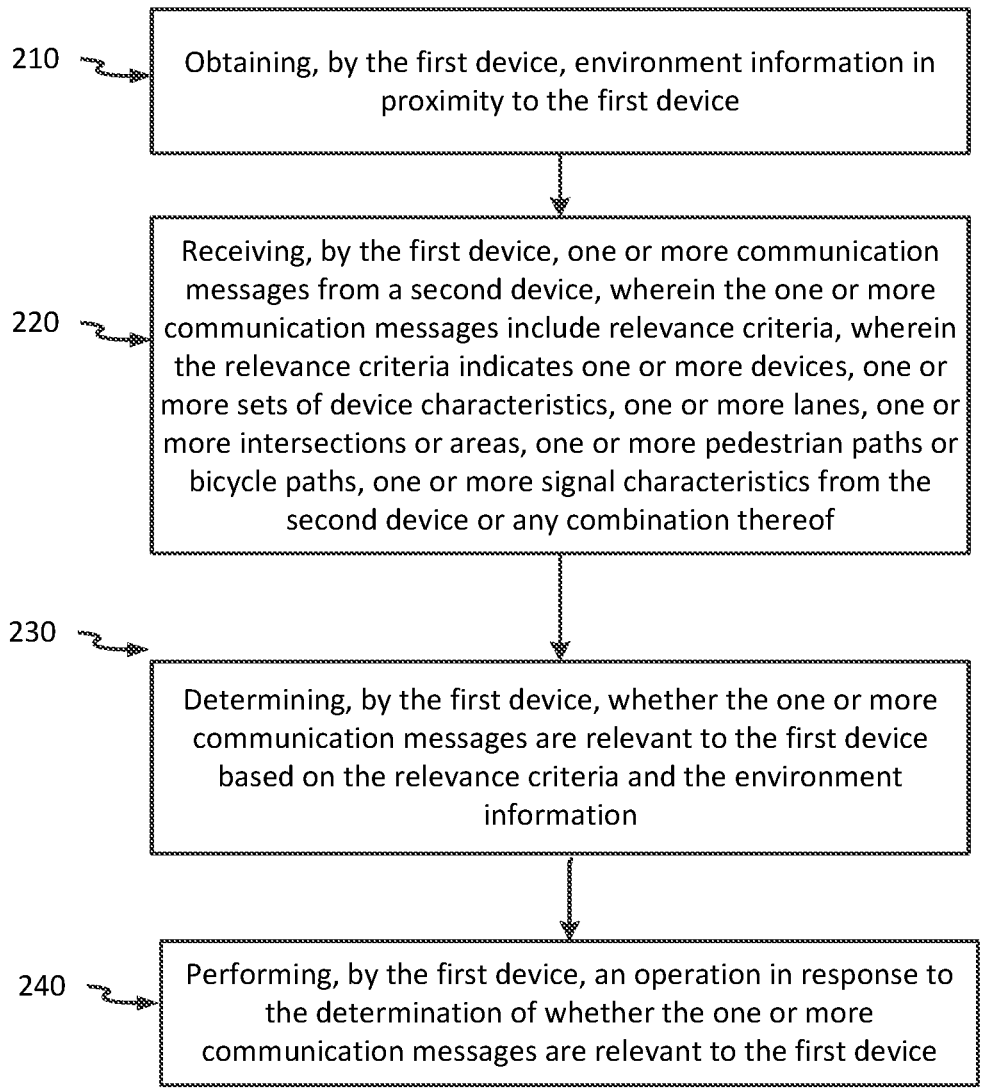
FIG. 2 shows an example process diagram illustrating a method of determining whether one or more communication messages are relevant to an ego device.

FIG. 2 is a process diagram 200 illustrating an example method of determining whether one or more communication messages are relevant to an ego device.

At block 210, a first device obtains environment information in proximity to the first device. The first device may be a mobile device 100 (e.g. a vehicle, a smartphone, etc.) or wireless infrastructure (e.g. an access point 115, base station 110, road station unit (RSU), etc).

The environment information may be, in a non-exhaustive list and merely for illustrative purposes, one or more images from one or more image sensors, one or more ultrasound data from one or more ultrasonic sensors, one or more radar data from one or more radars, one or more LiDAR data from one or more lidar sensors, information from a radio frequency (RF) source, one or more real-world traffic models (RTM) or any combination thereof.

The RTM may include device map information that indicates one or more position information for each device and one or more device identification for particular devices in the area. For example, the device map information may include a specific vehicle that includes absolute coordinates for the vehicle and the vehicle's license plate as an identifier.

In one embodiment, the device map information may also include the receiving device's (e.g. reporting device's, ego device) position. The position may be absolute coordinates (e.g. latitude and longitude); cross streets; visible base station, access points, RSUs; recently passed intersections; intersections or areas (e.g. parking lots, driveways, etc); lane position (e.g. what lane the vehicle is on); pedestrian paths; bicycle paths; relative position information with respect to the first device, or any combination thereof.

Position information at a specified time may be ranging (e.g. distance relative to subject vehicle at some time) and/or orientation. The term "relative pose" is also used to refer to the position and orientation of a vehicle relative to a current position of a subject vehicle. The term "relative pose" may refer to a 6 Degrees-of-Freedom (DoF) pose of an object (e.g. target vehicle) relative to a frame of reference centered on a current position of a subject (e.g. subject vehicle). The term relative pose pertains to both the position (e.g. X, Y, Z coordinates) and orientation (e.g. roll, pitch, and yaw). The coordinate system may be centered: (a) on the subject vehicle, or (b) on image sensor(s) obtaining images of the target vehicles). In addition, because vehicular motion on roads is typically planar (i.e. the vertical motion is constrained) over short distances, the pose may also be expressed, in some instances, in lesser degrees of freedom (e.g. 3 DoF). Lowering the degrees of freedom available may facilitate computations of target vehicle distance, target vehicle relative pose, and other position parameters related to the target vehicle.

The one or more position information may comprise range, orientation, range angle, RF characteristics, absolute coordinates, velocity, position uncertainty, confidence level, position measurements or any combination thereof.

For example, the position information may include a range, which indicates a distance from the ego device or another device (e.g. a relative position). This may be expressed in any unit and/or any resolution. For example, it may be expressed as meters, centimeters, inches, etc.

The position information may comprise an orientation. For example, the reporting device may report the orientation of the object or measured device relative to the reporting device and/or it may provide an absolute orientation (e.g. relative to magnetic north).

In an embodiment, the position information may comprise a vector that includes a range and a range angle. The vector may be relative to the ego device, an object or another device. For example, the vector may be relative to a billboard along a highway.

In an example, the position information may comprise RF characteristics. The RF characteristics may comprise signal strength, round trip time, time difference of arrival, doppler shift or any combination thereof.

In an example, the position information may comprise absolute coordinates. The absolute coordinates may be in latitude, longitude and/or elevation. The absolute coordinates may be Cartesian coordinates.

The terms "Doppler shift," or "Doppler frequency shift," or "Doppler effect," pertain to an observed change in frequency of a received signal (e.g. at a receiver) relative to the frequency of the transmitted signal (e.g. by a transmitter) on account of relative motion between the receiver and the transmitter. Doppler measurements may be used to determine range rate between a subject vehicle (e.g. receiver of V2V communications) and a target vehicle (e.g. transmitter of V2V communications). Range rate pertains to the rate at which the range or distance between the subject vehicle and target vehicle changes over some time period. Because nominal frequency bands for V2X, cellular, and other communications are known, the Doppler shift may be determined and used to calculate range rate and other motion related parameters.

The position information may also include position location characteristics, such as position uncertainty and/or confidence level. For example, position uncertainty may include horizontal dilution of precision. The confidence level may indicate the confidence the ego device may have in the position estimate, the technology used to make the measurement or any combination thereof.

The device identification may comprise a globally unique identifier, a locally unique identifier, a proximity unique identifier, a relatively unique identifier, one or more device identification characteristics or any combination thereof.

A globally unique identifier may include a globally unique license plate, a license plate with a region identifier, a medium access control (MAC) address, vehicle identification information (VIN) and/or some other identifier. The region identifier may indicate where the license plate identifier was issued thereby making it globally unique. For example, a license plate "5LOF455" may have been issued in California, so the license plate with the region identifier of California resulted in a globally unique identifier.

A locally unique identifier may include a license plate, a VIN, or some other identifier. A locally unique identifier is capable of being used again in a different region. For example, a license plate identifier, such as "5LOF455", may be unique within California, but it can also be repeated in a different region, such as Washington. The region may be of any size or shape. For example, the region may be a continent, country, state, province, county, zip code, neighborhood, street, cross streets, etc.

A proximity unique identifier may be a unique identifier within a distance and/or time threshold. For example, a device may report a nearby vehicle that is likely to be unique within a hundred meters. As an example, a device may report a nearby vehicle that is likely to be unique within thirty seconds. The distance threshold and the time threshold may be of any unit and/or resolution.

A relatively unique identifier may be a unique identifier for a device as determined by the ego device. For example, a wireless road side unit (RSU) may communicate with multiple vehicles and assign them a unique IP address while they are in communication with the RSU, so the devices may have a relatively unique identifier (e.g. IP address).

In one embodiment, the device identifier may include one or more sets of device characteristics. A set of device characteristics may comprise make, model, color of the device, device year, device trim, one or more dimensions of the device, shape of the device, one or more capabilities of the device (e.g., turning radius), one or more observable characteristics of the device, software type or version of the ADAS system, trip related information (e.g. passenger count, current location, destination), vehicle behavior (vector acceleration, velocity, location, braking status, turn light status, reverse lights status, etc.), other information (e.g., urgency code—such as late to work, vehicle use code such as newspaper delivery, garbage truck, sightseeing/tourism, taxi, etc.), or any combination thereof. A set of device characteristics may includes a single device characteristics (e.g. color, make, model, etc.).

For example, the observing device may identify a nearby subject vehicle as being a Honda Civic and determine it is the only Honda Civic nearby or within line of sight of the ego device. The ego device may then use "Honda Civic" as a device identifier.

The observing device may identify two nearby vehicles that are both Honda Civics, but may use the color of the vehicle to further differentiate it (e.g. one vehicle is black, and the other vehicle is silver).

In another example, there may be two vehicles that are both Honda Civics, but can be differentiated based on their year and/or trim. For example, one Honda Civic may be a 2018 model, but the other Honda Civic may be a 2005 model. In one embodiment, the form factor for a vehicle may be similar across multiple years, so instead of providing a specific year, it may provide a range of potential years.

Additionally, the color of the year may be used to identify or narrow down the potential year of manufacture (or selling year) that could be associated with the vehicle. For example, beige may be a color choice for a first year, but it is unavailable for the next three years for that form factor.

In one embodiment, there may be slight changes to the form factor that may be used to identify the year of manufacture (or selling year). For example, there may be slight tweaks to the rims/hubcaps, lights, etc.

The device trim may also be used to identify the device. For example, a first vehicle may be the same make and model of a second vehicle; however, the first vehicle may be standard trim, but the second vehicle may be a luxury trim, which may be indicated based on various factors, such as the headlights, roof configuration (e.g. panoramic roof, cross bars, etc.), spoiler, manufacturer's markings, etc.

The device dimension(s) may be used to identify a nearby vehicle, such as width, height, length, form factor (e.g. vehicle type), 3D model of the vehicle, or any combination thereof. For example, there may be two similar vehicles, such as they have the same make and/or model, but one vehicle may have been modified (e.g. tow package) that results in it having a different dimension versus the other vehicle. The different dimensions may then be used to distinguish the two vehicles. This may be a temporary distinguishing identifier until the two vehicles are no longer in proximity or until the temporary distinguishing identifier is no longer needed.

The RTM may also include pedestrians, bicyclists, signs, road conditions, traffic lights, etc. It is important to note that some traffic lights may include functionality that enables it to be a RSU or server, in that case then the traffic light would be included as a device, but a traffic light that is unable to communicate with nearby devices and/or sense nearby devices then those would be classified under a non-device; this is similar for these other non-devices, such as pedestrians, bicycles, etc. In one embodiment, if the pedestrian and/or bicyclist is carrying a device that is identified by the observing device, that is aiding in the generation of the RTM, then the carried device may be reported as a device, but it may also report the non-device (e.g. pedestrian) and it may provide a device identifier and/or the non-device identifier (e.g. pedestrian's color shirt).

According to an aspect of the disclosure, the non-device information may also include characteristics. For example, an ego device may determine characteristics associated with traffic lights at an intersection, such as the traffic light state (e.g. red, yellow, green), light intensity, whether it is blinking or not, etc. These characteristics can be provided the device map information and may be provided in the RTM so a second device may make decisions based on this information. For example, if the traffic light has been green for a minute, the RTM indicates vehicles near the intersection have been moving for the last minute, but the car in front of the second vehicle is not then the second vehicle may use determine, via its behavior/route planning (which may also include motion and path planning) component, that the second vehicle to move into another lane. Additionally, this information may be provided to third parties, such as operators of the traffic lights (e.g. cities, municipalities) for various purposes, such as but not limited to determine when traffic lights need to be replaced, when they are unreliable, etc.

The RTM may indicate the capabilities and/or shortcomings of the observing device, that aided in generating the RTM, as part of the device map information and/or separately. For example, the observing device, may be a vehicle, and it may indicate that it only has front facing cameras, so it is unable to detect nearby devices that are not in front of it.

In another example, the observing device may indicate it has front facing cameras, GNSS, ultrasound sensors around the device and a forward-facing radar system. In this scenario, this indicates that the ego device may have a reliable uncertainty value associated with its location (because of the GNSS receiver), but that it may only see devices that are in front of it because the ultrasound sensor may require close proximity to detect other nearby devices.

The observing device may indicate one or more areas that it is able to sense and/or one or more areas where it is able to identify nearby devices and/or non-devices. This may be indicated based on cardinal directions, intercardinal directions, angles relative to a cardinal or intercardinal direction (e.g. north), etc. For example, if the observing device has a front facing camera and a back facing camera, it may indicate it is able to sense or identify nearby devices and/or non-devices from north-west to north east and south. This information may be indicated in the device map information and/or separately.

In one embodiment, the observing device may indicate one or more areas that it is not able to sensor and/or one or more areas where it is not able to identify nearby devices and/or non-device and may be similarly performed as described above and throughout the specification. The RTM may already have information relating to the reliability of the device map information as provided by the observing device, or the RTM may have reliability determined by the observing device. The observing device may provide reliability information related to the device's capabilities. For example, if the observing device determines that the forward facing camera intermittently is unable to receive image data then the ego device may determine a reliability score based on when it is unable to receive image data, whether it is able to receive image data currently, whether other sensors detect an object that has not or was not identified in the image data, etc. In another example, the observing device may determine that the camera image data in unable to detect any objects during some weather conditions (e.g. rain, snow, fog, etc.) or timing related to weather conditions (e.g. within the first thirty minutes of the turning on the device when the weather condition is present), so the observing device may set a low reliability score for the device's camera capabilities. This information may be indicated in the device map information and/or separately.

This RTM may be provided to the ego device 100 by a server 140 (or similar, such as a gNodeB, RSU, etc.), one or more nearby devices or a combination of both.

The one or more sensor data, such as images, ultrasound data, LiDAR data, etc. may be obtained by the ego device 100, one or more nearby device, one or more nearby infrastructure devices (e.g. RSU, traffic lights, etc.), or any combination thereof.

The information from an RF source may include position information about the RF source, a relative range to the RF source by the first device, or both. The RF source may be an internet of everything (IOT) device, such as a marker. These markers may be placed along the road and/or may be placed on, in proximity to, or integrated with signs, traffic lights, guardrails, traffic lights, etc. The RF source may also be the RSU.

At block 220, a mobile device 100 and/or a server 140 receives one or more communication messages from a second device, wherein the messages include relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof. The one or more communication messages may be received via a managed network, unmanaged network, or a hybrid managed network. The one or more communication messages may also be received via a point-to-point messaging, broadcast/multicast messaging or a combination. The one or more communication messages may be a V2V, V2I or V2X messages. The relevance criteria, from the second device, indicates to whom the communication message is relevant to (e.g. specific devices, areas/zones, etc.). This is difference from environment information, which generated by the first device or provided to the first device, wherein the environmental information is determined by a non-communication component (e.g. video/images, auditory, GNSS/ sensors, radar, LiDAR, etc.).

The one or more communication messages may be from one or more vehicles, servers, infrastructures, traffic lights, RSUs or any combination thereof. For example, one or more communication messages may be received from a traffic light indicating which vehicles may proceed through an intersection or vehicles traveling in a particular direction may be allowed to proceed for a certain duration. In another example, the one or more communication messages may indicate that a vehicle is intending to merge into a particular lane.

The relevance criteria in the one or more communication messages may indicate one or more location parameters, one or more sets of device characteristics, one or more time parameters, one or more signal characteristics or any combination thereof. The location parameters may indicate one or more lanes, one or more directions, cross streets, latitude/ longitude, entrance/exit for a highway, one or more intersections or areas (e.g. driveways, parking lots, etc.), one or more pedestrian paths, one or more bicycle paths, one or more streets, location with a distance or time threshold, relative distance/orientation to objects, or any combination thereof. For example, a vehicle may indicate there is an emergency so all vehicles that are within ten miles of a particular location going north bound in the third lane should move over so the vehicle can get through traffic.

The one or more sets of device characteristics may indicate form factor of a vehicle, make, model, color, year, trim, unique features, vehicle type or any combination thereof. The one or more device characteristics may indicate who the transmitting device intends to communication with, to or about. For example, the transmitting device may identify a vehicle that is about to get into an accident, so it may transmit information to the vehicle or to nearby vehicle to help mitigate damage from the accident.

The one or more time parameters may indicate a time or time period when the messages are relevant, a time or time period when the messages are no longer relevant, a time duration when the messages are or are not relevant or any combination thereof. For example, the second device may indicate the message is only applicable at 9:00 AM PST, from 9:00 AM PST to 10:00 AM PST, for ten seconds from when the message was sent and/or received, etc.

The one or more signal characteristics may indicate the signal-to-noise ratio (SNR) threshold(s), a distance/range threshold, or any combination thereof. For example, the second device may indicate the message is only relevant if the SNR threshold is above −60 decibels relative to milliwatt (dBm), such as −30 dBm. In another example, the second device may indicate the message is relevant as long as the first device is within five meters of the second device.

In one embodiment, these relevance criteria, as listed above, may be combined in any manner (e.g. one or more signal characteristics with one or more time parameters). For example, the second device may indicate in the messages that it is relevant for as long as the first device sees an SNR from the second device above −40 dBm, but when it drops below the −40 dBm threshold then the message may still be relevant for ten seconds. It may also indicate the time duration restarts from zero if the SNR returns above −40 dBm but later drops below that threshold.

The one or more communication messages may also include additional information, such as intention(s) of the transmitting device (or the second device), issue(s), requests (e.g. vehicle platoon requests). These are discussed later in the specification.

According to an aspect of the disclosure, the relevance criteria may indicate specifically which devices the messages are intended. For example, the second device may transmit the messages and in the relevance criteria may identify the first device as the intended device.

The relevance criteria may indicate a specific device but include that the transmitted message is relevant to any device that has line of sight to the that specific device (may also indicate the message is relevant to the specific device). For example, if the second device is transmitting a message that indicates a blue truck is causing a problem (e.g. running a red light, about to cause a collision) then it may indicate in the relevance criteria that any device that has line of sight to the truck should watch out. Line of sight may be determined based on image/video data from one or more cameras, may be determined via a communication link, radar, ultrasound, LiDAR, etc.

The one or more communication messages may include vehicle conditions/state information, autonomous functionality capabilities, autonomous functionality currently engaged by the vehicle, vehicle sensor readings, vehicle historical sensor readings, vehicle environmental readings, vehicle historical environmental readings, destination(s), potential future paths, current paths, passenger information, RTM or any combination thereof.

The one or more communication messages may include the transmitting device's conditions/state information, such as normal operations, sensor errors, braking errors, autonomous functionality issues, etc. It may include information more specific to receiving device, such as transmitting device needs additional spacing between it and other vehicles because of an error condition.

The message(s) may similarly include either by itself or in addition to the other information, information about nearby devices. For example, if the transmitting device detects a potential issue with a nearby device, it may notify other devices about the nearby device.

The one or more communication messages may include information about the vehicle's autonomous functionality capabilities. For example, it may include the vehicle is capable of radar, ultrasound, camera, GNSS, etc. It may also include positions of where these sensors are located. It may include firmware or software versions. It may indicate algorithms names, versions, capabilities, etc. It may also indicate the framework that was used in generating the algorithms or the machine learning inference, such as TensorFlow, Caffee2, etc. It may indicate the autonomous level capabilities, such as Level 1, Level 2, Level 3, Level 4 or Level 5. It may also indicate which standards body or governing entity it is using for those classifications (or it may be standardized in all vehicles in that jurisdiction to indicate they are all using Social of Automotive Engineers (SAE) definitions for the communication standard that is being used, such as V2X. Similarly, if this information is obtained from other nearby devices, this information may be aggregated by the transmitting device and transmitted to nearby devices so each device does not have to collate this information by itself. This collated information may also be provided to a server, RSU or network edge device so nearby devices can retrieve or be provided with this information.

According to an aspect of the disclosure, the one or more communication messages may indicate what autonomous functionality is engaged, in the process of being engaged, may be planned to be engaged, may potentially be engaged or any combination thereof. For example, it may indicate that it is being manually driven, but dynamic cruise control and automated emergency braking is engaged. It may indicate that the lane keeping feature is enabled. In one embodiment, the message(s) may indicate the limitations of the engaged features, such as for lane keeping it may indicate it will only keep the vehicle in the lane up to a threshold amount (e.g. it can readjust the vehicle into the lane after coming close to the edge or cross the lane marker, but only for a threshold number of times).

The one or more communication messages may indicate the vehicle's sensor readings or vehicle's indicators based on the sensor readings. For example, it may provide the vehicle's accelerometer data or it may indicate that the vehicle just experience black ice because it was sliding over a section of the road (e.g. road condition information). It may indicate engine problems, braking problems, etc. It may also indicate the engine response/performance, braking response/performance, steering response/performance, etc. Similarly, it may provide historical sensor readings or historical vehicle indicators based on the sensor readings at that time.

The one or more communication messages may indicate the vehicle's sensor readings about the environment external to the vehicle or the vehicle's indicators based on the environmental sensors. For example, the vehicle may have obtain environmental measurement in proximity to the vehicle (e.g. humidity, CO2 levels, water detector/levels, CO levels, etc).

In one embodiment, the vehicle may determine information based on the sensor measurements. In another example, the vehicle may obtain sensor measurements from the inertial measurement unit (IMU) to determine the road conditions. If the IMU experiences a sudden, short drop then the device or vehicle may classify that location as have a pothole. It is important to note that these road conditions may be one or more algorithms to determine the various road conditions and/or it may use the sensor measurement data in conjunction with an inference model that was developed with machine learning or deep learning to determine or infer the road condition.

The one or more communication messages may indicate one or more destinations, potential paths, planned paths of the device or any combination thereof. The device may indicate destinations that is trying to navigate to current or at a future time. The device may indicate routes or paths that the device may navigate or what the device currently plans to navigate. For example, the device may indicate which lane it is currently in and when or if it plans to change lanes. In another example, the vehicle may predict how a driver of the vehicle will progress along a path or through an area, such as an intersection, based on the drivers historical driving patterns, historical patterns through a similar or the same area, etc. In these assistance systems, the vehicle may provide a guidance to a driver about the vehicle's projected path, but the vehicle may provide one or more communication messages when a driver deviates from the projected path and/or may provide an updated path based on the driver's actions.

According to an aspect of the disclosure, the one or more communication messages may indicate passenger information. It may indicate number of passengers, passenger positions, characteristics about the passengers, etc. For example, it may indicate a passenger is a baby in an infant car seat, a passenger with a mobility disability, etc. It may indicate where passengers are located within the vehicle. For example, in one use case the passenger position information may be used when a passenger is trying to take a picture near famous landmark so a nearby device may use this information to avoid blocking the line of sight of the passenger.

According to an aspect of the disclosure, the one or more communication messages may indicate RTM information that the device has generated, modified or received. This may allow nearby devices to quickly access this information instead of having to contact a remote server, an RSU that is further away than the device, or another device (such as an RSU) that may not have pertinent information to a requesting device or a device in proximity to the transmitting device.

The one or more communication messages may be from an RSU, server, or infrastructure to a vehicle, bicyclist, pedestrians, etc. that indicates which device or user type may proceed through an intersection or area, which lane and/or direction is allowed to proceed, etc. For example, the RSU may indicate that vehicles and pedestrians are allowed to proceed northbound but vehicles attempting to take a right may wait even if they are in the northbound lanes to avoid collisions with pedestrians that are proceeding northbound. This information may be provided by or in addition to a traffic light and/or cross walk signs that indicates when vehicles and/or pedestrians may proceed or when they should stop.

The one or more communication messages may provide timing information for how long a particular lane or direction will be allowed to proceed through the intersection. This also applies if this is being schedule on a per vehicle or group of vehicles basis. This information may be useful to the receiving device so they can get a more accurate estimate of time to destination, improving route planning, crowd-sourcing this information to provide to other devices, when a vehicle should adjust their speed (e.g. slow down because the intersection is going to indicate the vehicles should heading in that direction will be instructed to stop in two seconds) based on this information, etc. This information may also be used to be compared against historical and/or predicted times to further improve the historical and/or predicted models. The one or more communication messages may be provided by or on behalf of the traffic light and/or crosswalk sign to indicate planned downtimes, status information, etc.

At block 230, the first device (e.g. mobile device 100 and/or a server 140) determines whether the one or more communication messages are relevant to the first device based on the relevance criteria and the environment information. For example, the first device may determine the relevance criteria is applicable to vehicles in the second lane and the first device (or nearby devices) may capture one or more images and determine it is in the second lane, so it may determine the one or more communication messages are relevant to the first device. In another example, the first device may obtain the RTM and the one or more communication messages may indicate criteria that specifies all devices in the second device's current lane, so the first device may use the RTM to determine which lane the transmitting device is currently in and may also use the RTM to determine whether the first device is in the same lane as the second device to determine the relevance of the one or more communication messages.

The first device may determine whether the one or more communication messages are relevant by obtaining one or more device characteristics corresponding to the first device and comparing the first device's characteristics to the one or more sets of device characteristics in the relevance criteria. For example, if the one or more communication messages have relevance criteria that indicates it is relevant to a "White Ford Bronco" and the first device is a "White Ford Bronco", then the first device may deem the messages relevant to it. The first device may obtain one or more device characteristics corresponding to itself from one or more sources, such as but not limited to, memory, OEM database (e.g. make/model/year lookup), live image data from nearby devices, historical image data from nearby device, etc.

The first device may determine whether the one or more communication messages are relevant to the first device by comparing the first device's location to area or zone indicated by the relevance criteria in the one or more communication messages. For example, if the first device determines it is in the middle northbound lane and the relevance criteria is for the middle northbound lane then the one or more communication messages are relevant to the first device. The first device's location may be an absolute location, landmark based (e.g. cross streets, lane markers, street signs, buildings, etc.), a relative location, etc.

According to an aspect of the disclosure, the first device and/or other devices may validate or verify the messages are coming from the second device by comparing the signal characteristics to the where the second device is supposedly located. For example, the signal characteristics of the messages may indicate a time of departure and that may be used to determine a distance based on the time of arrival and time of departure and this distance will be compared against the first device's location to determine whether the second device location is comparable (e.g. within the distance range from the first device). Another way of validating the device is to see if other nearby devices that are in proximity to the second device are also hearing the same message from the second device. The other nearby device may or may be requested to capture images of the second device to confirm it is the vehicle in the RTM that the first device believes the second device to be. This is further described throughout the specification, but it is important to note that this validation/verification may occur at various points in the process and may be done multiple times in the process. Additionally, this validation process may be done periodically, such as platooning.

At block 240, the first device (e.g. mobile device 100 and/or server 140) may perform one or more operations in response to the determination of whether the one or more communication messages are relevant to the first device. The one or more operations may comprises transmitting a response to the second device, establishing a direct communication link with the second device, setting a pertinence level associated with the second device, performing one or more actions, displaying or providing the one or more communication messages to one or more users associated with the first device, generating one or more notifications based on the one or more communication messages, requesting one or more actions to be performed by the second device or any combination thereof.

In one embodiment, the one or more operations may comprises transmitting a response to the second device. The response to the second device may be an acknowledgement message (ACK) or a negative acknowledgement message (NACK). The response may be solicited, meaning the second device requested a response, such as ACK or NACK, or may be unsolicited.

The one or more communication messages, transmitted by the second device, may indicate whether or not the transmitting device wants the receiving devices to transmit ACK or NACK. In one embodiment, the second device may request that all receiving devices respond whether the one or more communication messages have been received, whether the one or more communication messages are relevant to the receiving device or any combination thereof. The second device may request that only devices that determine the one or more communication messages are relevant to them should respond with an ACK or NACK.

According to an aspect of the disclosure, a receiving device, such as the first device, may be requested to transmit an ACK or NACK if it determines that the one or more communication messages are relevant; however, the receiving device may determine they only meet a portion of the criteria but above a threshold so they may transmit a NACK message to indicate they do not believe they are relevant even though only ACK messages are requested. For example, a receiving device may determine they match the form factor, make, model, year, trim but they do not match the color, so they may transmit a NACK message to the transmitting device. In a continued example, the receiving device may determine they are the only (or one of a few) vehicle that appears to match most of the criteria in the one or more communication messages so they may use that to send a NACK message (even if it is not solicited). In one embodiment, the NACK message may include the reason for the rejection (e.g. only met nine out of ten criteria). According to an aspect of the disclosure, the devices may send NACKs when it is unable to get the entire message (e.g. decoding issues, etc). It may also be used when there are errors generated by the running program(s), such as an inference that misidentifies a device then the device may respond with a NACK that it does not see that device and/or it is not that device. It may also be sent when the received device believes that the transmitting device is a spoof or being spoofed, and it may also send a message to the transmitting device or other nearby devices to validate or determine whether the transmitting device is being spoofed.

The second device (e.g. transmitting device) may receive the NACK message and may transmit a query message to the first device (e.g. receiving device) to get more information on why the first device sent a NACK. The query message may ask for a rejection reason that may be a value that is associated with a predetermined response (e.g. zero may correspond to most criteria matched but not all, one may correspond to not the correct make, etc.). It may also include OEM predetermined response, jurisdiction specific predetermined responses, etc.

The first device may set a pertinence level associated with the second device based on the determination of whether the one or more communication messages are relevant to the first device. For example, if the first device determines that the one or more communication messages are relevant to the first device then it may increase the pertinence level for the second device (and if not relevant then it may lower the pertinence level).

The pertinence level may be used to determine which device's messages should be processed first, because those devices are presumably nearby the receiving device so they may perform an action the receiving device should handle quickly (e.g. to avoid an accident, coordinate actions, etc.).

The first device may perform one or more actions in response to the determination that the one or more communication messages are relevant to it, such as wait to proceed through an intersection, speed up, request additional information from the second device, perform one or more vehicular maneuvers, coordinate with the second device and/or one or more other devices, communicate with the second device, etc. or any combination thereof.

According to an aspect of the disclosure, the first device may determine whether to coordinate with the second device. This may be one of the actions described above or it may be another action in addition to the performing one or more actions described above. The first device may determine whether to coordinate with the second device based on one or more device characteristics of the second device and the environment information. The one or more device characteristics of the second device may be provided in the one or more message. The first device may determine that the second device is in the same lane and in close proximity so they can form a platoon and coordinate their actions to optimize the spacing between the vehicles and reduce drag on the vehicles.

In another example, the first device and second device may coordinate so one of the devices can merge into the other device's lane. This may be based on proximity, whether there is spacing for the vehicle to fit in front or behind the other vehicle, whether the vehicle can speed up or slow down to create a space of the merging vehicle, etc. It may use other factors such as whether the potentially merging vehicle is being manually driven vs. autonomously driven, number of passengers, destination, etc.

In one embodiment, the first device may determine whether to communicate with the second device based on the one or more device characteristics of the second device and the environment information. This may occur similarly to the description above about coordinating between two devices.

According to an aspect of the disclosure, the first device may determine whether to perform a vehicular maneuver based the one or more message. This may occur in response to the determination to coordinate and/or communicate with the second device, it may occur after the determination of that the one or more communication messages are relevant or after performing the one or more actions. The first device may use the requested move or the planned action of the second device to determine whether or not the first device should perform a vehicle maneuver. For example, if the second device is attempting a lane merge into the first device's lane it may use identify that the second device is going to attempt a lane merge behind the first device and the first device may determine there is sufficient space for the second device so the first device may determine it may maintain its current plan. If it determines that the second device needs more room to merge, then the first device may speed up (e.g. vehicle maneuver). It is important to note that vehicle maneuver may include one or more speed changes, one or more directions changes/one or more routes or any combination thereof.

In one embodiment, the first device may request additional information from the second device and/or one or more other nearby devices. For example, the first device may determine or may be configured to further validate which device is providing relevant messages. The first device may use this information or the response to this request to determine whether the second device is not being spoofed or providing false information. The first device may request that the second device capture images of the first device or other devices, perform one or more driving patterns, perform visual communications, emit an auditory sound (or particular sound), road surface characteristics, RF characteristics, or any combination thereof.

The one or more images of the first device or other devices may provide perspective information to indicate the position and/or orientation of the device. This position and/or orientation of the device may be used to validate whether the second device is the same device that the first device is communicating with over an RF communication link and/or determine that the second device is a non-spoofed device. In one embodiment, the one or more images may be used to determine whether the second device is within line-of-sight of the first device. The first device may request one or more other devices to capture one or more images of the second device to validate whether the second device is the same device that the first device is communicating with over an RF communication link. This may similarly done by the second device to verify the first device.

The second device may be requested to perform one or more driving patterns, such as drifting or moving to a particular lane, turning, braking, stopping, slowing down, moving, any sequence of one or more of these actions or any combination thereof. For example, it may request that the second device perform three light and short braking bursts within a particular time period to validate that the device in the RF communication link is the same as what is seen in the environment information.

This is similar done for auditory and visual information. It may request a horn honk, duration, sequence, audio sound type/noise, volume, frequency, etc. For visual communication, it may request visible light communication (e.g. through brake lights, headlights, etc.), it may ask for a particular pattern, duration, intensity, frequency, etc.

The first device may request road surface characteristics. For example, if the second device and first device are in the same lane it may request road surface characteristics over a particular span of road. This may be accelerometer data, radar, lidar, ground penetrating radar, etc. that would indicate the road surface and it would be compared to what the first device has seen for the same span of road. This may be used to validate that the second device is the same device that the first device is communicating with over the RF communication link.

According to an aspect of the disclosure, the first device may use the response by the second device to determine whether or not the second device is a non-spoofed device. For example, the first device may request that the second device change their brake lights at a particular frequency in a particular pattern, and if the second device performs these actions and this is captured by the first device or a third device, then the first device can determine that the second device is non-spoofed, meaning the second device that is communicating over a communication link with the first device is the same device that the first device or a third device can identify through other means (e.g. camera, radar, ultrasound, LiDAR, etc.).

The first device may establish a direct link with the second device. The one or more communication messages may be transmitted via a broadcast/multicast message, but after the first device determines that one or more communication messages may be relevant to it, it may then establish a direct link (e.g. point-to-point messaging) with the second device.

The direct link establishment may involve the first device transmitting configuration information to the second device, such as channel parameters, power levels, encryption keys, etc. The second device may send an ACK or NACK message in response to these parameters and/or the request to establish a direct link. In one embodiment, the second device may determine based on its proximity to its destination, duration left on the road, distance until switching to leaving that road, speed of itself relative to the other vehicle, speed of the vehicle, speed of the first device or any combination thereof whether or not to accept the request to establish a direct communication link.

The second device may accept the direct communication request by sending an ACK message and/or establishing the link using one or more of the parameters provided by the first device. For example, if the second device determines there is too much interference (e.g. above an interference threshold) on a particular channel or frequency, it may send a message to the first device to use a second channel or frequency provided by the second device instead of the first channel or frequency requested by the first device.

The direct link may enable more efficient communication in some scenarios, such as coordinated driving actions (e.g. vehicle platoon maneuvers, etc.) or specific communication purposes. The direct link may also be used to provide encryption information (e.g. keys, certificates, etc.) so data may be encrypted over a broadcast channel but still allow it to be protected between two specific devices (e.g. first device and second device, but prevent a third device from receiving the encrypted content).

It is important to note that, in at least one embodiment, the direct link may be established after the first device has validated the second device (and vice versa). The validation process may be the request for additional information, as indicated earlier in the specification. This is an iterative process, so the first device may request specific additional information from the second device so the first device can ensure that the second device is not being spoofed or that the second device is a non-spoofed device (e.g. it is who they say they are) and/or to establish a confidence level with the second device. Once one or both devices have validated each other, then the direct link establishment may begin. In one embodiment, the validation may occur periodically or quasi-periodically after the direct link has been established.

According to an aspect of the disclosure, the direct link may be established without a validation process, such as emergency scenarios.

In one embodiment, the validation process may not require additional information from the second device, instead the RTM may be used by the first device for validation purposes. For example, the first device can use the RTM to determine where the second device is in proximity to the first device. It may use the RTM to determine a range and compare that to the range measurements it is performing with the second device. If the ranges are comparable within a threshold level, then the first device can determine that the second device appears to be who they are communicating with.

In one embodiment, this may occur over a period of time to adjust the confidence level that the second device is who they indicate that they are. For example, if the range measurement does not correspond to the RTM at a later time period, then the confidence level may drop. If they continue to correspond for several minutes then the confidence level may increase.

In one embodiment, the one or more communication messages may be provided or displayed to one or more user devices that are associated with the first device. For example, if the first device is a user's smartphone then the one or more communication messages may be displayed to the user via the smartphone's display or another display, via a wired or wireless connection. In another example, if the first device is a vehicle, the one or more communication messages may be displayed on one or more displays within the first device. Similarly, the communication message(s) may provide other notifications or additional alerts, such as auditory notification, haptic feedback, etc.

In one example, the one or more communication messages may be provided to a user's smartphone or other user device that is within the first device, which may be a vehicle. This may be routed to the user's device based on whether or not they have a navigation session running (e.g. Google® Maps is running on the user's smartphone so the communication messages may be routed to that device).

In one embodiment, the one or more communication messages are provided to every device within the vehicle, but the device determines whether or not to provide a notification based on the one or more communication messages. This may be done based on whether the device is running a navigation application, whether the device is paired or connected to the vehicle's auditory system (e.g. speaker system), whether the device is paired to one or more displays associated with the vehicle, the likelihood that the user will use their device for a navigation session (or already has within a time duration), or any combination thereof.

The one or more communication messages may be used to generate one or more notifications based on the communication message(s). For example, if the second device provides one or more communication messages that indicates a hazard in the right shoulder but the first device is in a middle lane then the hazard may not be relevant to it; however, a new issue may arise where vehicles from the right lane attempt to merge or will merge into the middle lane to avoid the hazard on the right lane. In this scenario, the first device may provide a notification to the driver, users in the vehicle or user devices associated with the first device. This notification may be generated based on an a-priori association for common occurrences (e.g. lane merges because of hazards, pothole detection, flooding, etc.), historical information where the first device has determined a correlation between two or more events, crowdsourcing information or correlations based on the crowdsourcing information, or any combination thereof.

The one or more communication messages from the second device may indicate what actions should be or may be performed by the first device, the one or more communication messages may indicate an event/issue or potential event/issue that may be affected and/or caused by the first device, the one or more message may indicate an intention of the second device, or any combination thereof.

The one or more communication messages from the second device may indicate what actions are requested of the first device (e.g. vehicular maneuver, etc.). The first device may determine whether or not to perform those actions and may notify the second device accordingly (e.g. ACK, NACK or may simply perform the action). For example, the second device may request that the first device speed up, and the first device may send an ACK message (to either acknowledge the message and/or to acknowledge it will perform the action). It may then speed up or notify the vehicular control to speed up.

The requested actions may also indicate a vehicle platoon request, vehicle dropout request, vehicle charging, parking, etc. For example, the second device may request to join the first device's platoon or to form a platoon, so both vehicles can coordinate driving actions for an overlapping journey (e.g. several miles on a highway, destinations that are similar/close in proximity/identical, etc.).

The request action may include whether the first device agrees with coordinated driving with the second device. This may be similar to a vehicle platoon request, but it may be a temporary action, a brief period of time, may need infrequent message exchanges, and/or may have larger spacing between vehicles compared to platooning. In one embodiment, the coordinated actions may be sent in a second set of one or more communication messages after the first device has agreed (or the second device) to perform coordinated driving actions. The coordinated actions may involve speed, vehicular movements, negotiation for spacing between vehicles, etc.

The one or more communication messages may indicate an event/issue or potential event/issue that may be affected and/or caused by the first device. For example, the first device (e.g. if it is a vehicle, or if it co-located with a vehicle) may have run a red light so the second device may indicate the first device should be watch out for a pedestrian that may be endanger of being hit by the first device/vehicle. In another example, there may be third device that is driving erratically, so the second device may notify the first device to slow down or avoid being in close proximity with the third device.

The one or more communication messages may indicate an intention of the second device, such as lane merge, pothole avoidance, requesting to move through an intersection, left turn, right turn, u turn, highway entrance/exit, parking, emergency maneuver, etc. For example, the first device may be moving in a perpendicular direction as the second device at an intersection, and the second device may indicate that it is going to proceed through the intersection, so the first device may use that information to determine when the first device can proceed through the intersection. In another example, the second device may indicate an intention to merge into a lane that includes the first device, so the first device may use that intention to determine whether to speed up or slow down.

Figure 3:
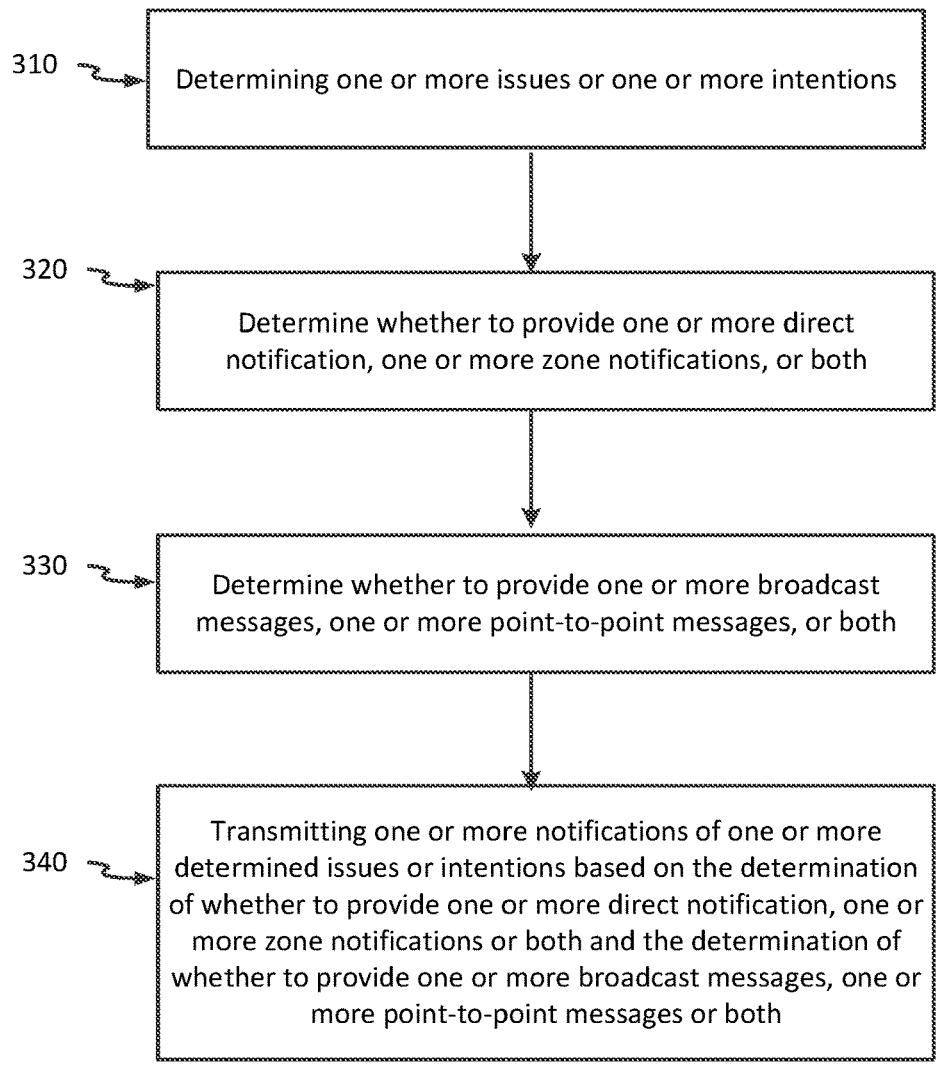
FIG. 3 is an example process diagram illustrating notifying nearby devices of issues and/or intentions.

FIG. 3 is an example process for notifying nearby devices of issues or intentions. At block 310, a device (e.g. mobile device 100 and/or server 140) may determine one or more issues or one or more intentions. For example, a device may identify a vehicle that has run a red light (or is not allowed to proceed through an intersection during that time period) so it may notify that vehicle to stop or be careful or it may notify nearby devices of this issue so they can be careful.

The device may also determine an issue with itself. For example, it may determine its brakes are failing, sensors are failing, accelerator is stuck, etc. The device may notify nearby devices that it is experiencing issues that it may not be able to correct immediately, so other nearby devices are give the device more space or provide a path for the device so the device may use external forces to stop (e.g. rock/sand path, runaway truck ramp, etc.)

The device may determine or identify an issue with the road. For example, it may detect black ice on the road, notify nearby devices accordingly and may report it to a server and/or RSU so devices not in communication range of the device may receive this warning as well. This may similarly be done for any other issue with the road, such as flooding, potholes, missing lane markers, etc.

The device may determine or detect an issue with one or more nearby devices. The device may have form factor information and/or other information about a nearby device, so if the nearby device does not correspond or conform to this information then the device may determine there may be an issue. The device may have a classifier or detector for specific issues, such as: mattress appears to be falling off, the ropes do not appear to be holding the item, smoke is coming out of the vehicle, the car appears to be on fire, etc.

The device may also notify nearby devices of its intentions. For example, a device or more specifically its planning and control function component (PCF) may determine that the device should change lanes or merge into another lane so the device may notify nearby devices of this intention.

At block 320, the device may determine whether to provide one or more direct notifications, one or more zone notifications or both. A direct notification indicates one or more other devices the messages are intended to be relevant towards. Similar to FIG. 1, may provide a unique identifier (e.g. globally unique, locally unique, proximity unique, etc.), one or more device characteristics, etc. to indicate whether the one or more communication messages are relevant to them.

A zone notification may indicate an area or an area relative to the device, so the one or more communication messages are relevant to any other device in the area. The zone notification may also indicate other parameters to filter the one or more communication messages, such as device type, direction, etc. For example, it may indicate a zone of devices within fifteen meters of the device but it may also indicate that the devices should be mobile devices (e.g. vehicles, pedestrians, etc.) and the devices should be traveling north or be crossing the north bound lanes (e.g. east to west or west to east).

The device may also send messages that include both direct notification and zone notifications. For example, the device may indicate that it intends to change lanes so it may send a direct notification to the two vehicles it wishes to get in between, but it may also send a zone notification to the lane beside the target lane it intends to merge into to make sure vehicles in that lane don't also merge into the target lane at the same spot as the device at the same time as the device.

The device may determine whether to provide one or more direct notifications, one or more zone notifications or both based on the use case scenarios, whether it was able to classify nearby device, or any combination thereof. For example, it may provide a direct notification for lane changes/lane merges, highway entrance/exit, but it may also provide zone notifications in those scenarios for added protection. If it identifies an issue that may affect a particular device, it may provide a direct notification to that device. In cases where it is unable to classify the device it may provide a zone notification so the device in the zone can be aware of the situation.

At block 330, the device determines whether to provide one or more broadcast messages, one or more point-to-point messages or both. The device may make this determination based on whether it needs to provide a direct notification, zone notification or both; whether it has identified the radio frequency (RF) communications of the one or more nearby devices to which it intends to communicate; the notification type; or any combination thereof.

For example, if the device needs to communicate with a large number of devices it may send a broadcast message. In another scenario, if the device needs to provide an emergency notification (e.g. notification type) to a specific device then it may send a point-to-point message; however, if it has not been able to identify the RF communications to the specific device then it would send it as a broadcast message.

At block 340, the device may transmit one or more notifications of one or more determined issues or intentions based on the determination of whether to provide one or more direct notifications, one or more zone notifications or both and the determination of whether to provide one or more broadcast messages, one or more point-to-point messages or both. For example, if a device identifies that a pedestrian and one or more vehicles may be on a collision course with a vehicle that has run a red light, then it may transmit one or more notifications to the pedestrian and the one or more identified vehicles via point-to-point messages, but then may also transmit one or more broadcast messages that indicate a zone notification for any vehicles or pedestrians that are not identified by the device.

Figure 4:
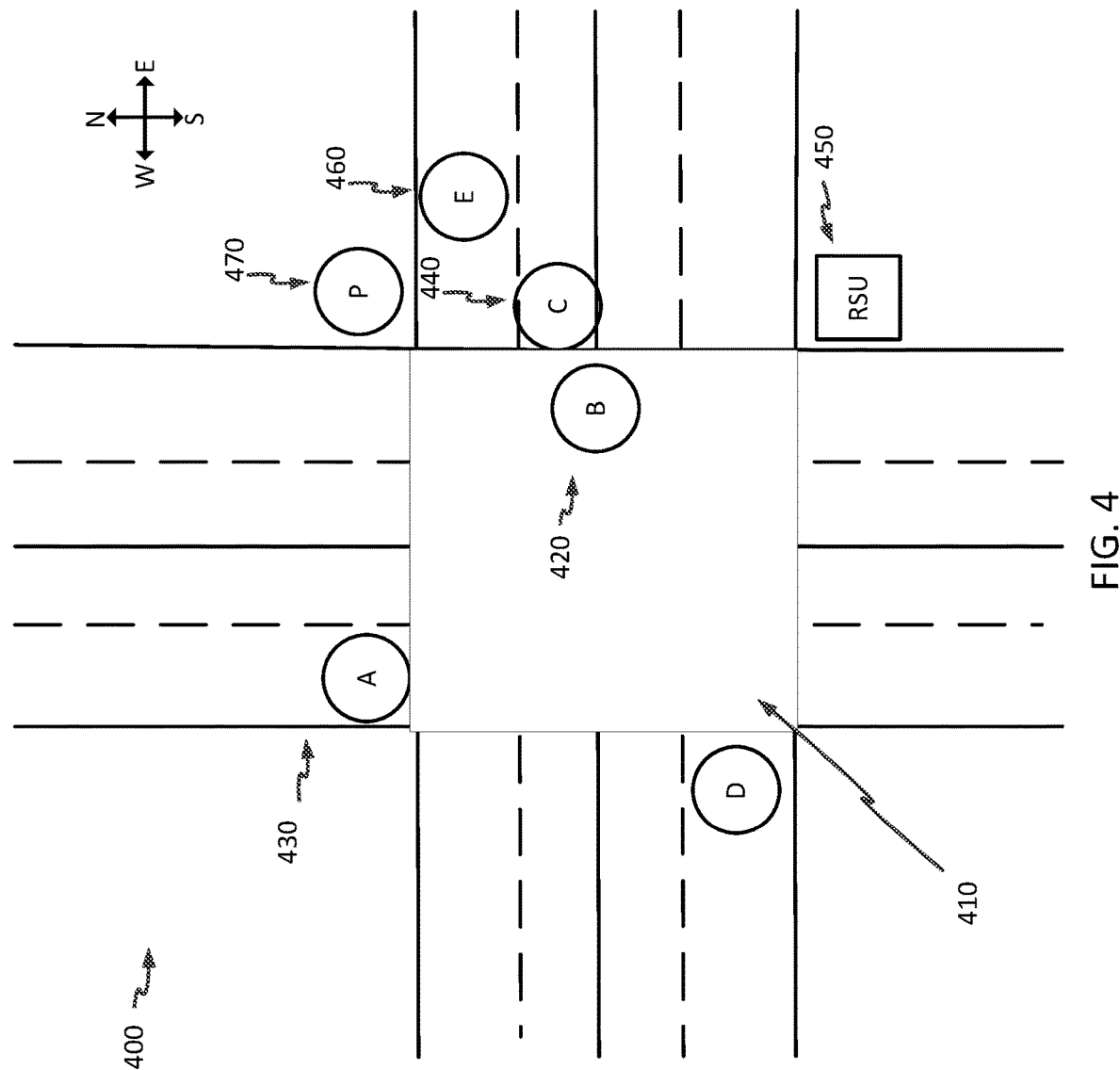
FIG. 4 is an example map of devices illustrating notifying nearby devices of issues and/or intentions.

FIG. 4 is an example diagram that may illustrate one or more processes as described throughout the specification. The example diagram 400 shows the Vehicle B 420 is proceeding through an intersection (from south to north) 410 at a time when it is not allowed to do so. Vehicles C 440 and Vehicle E 460 may be allowed to proceed through the intersection 410 (from east to west) at this same specific time; however, Vehicle E 460 may be unaware that it is on a collision course with Vehicle B 420 (because its camera system may be blocked by Vehicle C 440). Vehicle A 430 may identify or determine that this is an issue and may provide a warning to Vehicle E 460. This warning may be a broadcast message or a point-to-point message. In this example, the message to Vehicle E may be a direct notification. It may also provide a zone notification that are in proximity to the Vehicle C 440 and Vehicle E 460 to indicate both those vehicles may need to stop for safety reasons, so any vehicle behind them can use this message to slow down.

However, Vehicle A 430 may determine that both the pedestrian 470, Vehicle E 460 and Vehicle C 440 may be affected by Vehicle B's 420 action, so it may send a zone notification via a broadcast message to avoid proceeding from east to west through the intersection until Vehicle B 420 can exited the intersection or at the very least passed through the intersection of the corresponding lane (e.g. passed Vehicle C 440's lane).

In one embodiment, Vehicle A 430 may provide a zone notification via a point-to-point message to Vehicle C 440, and Vehicle C 440 may use this information to transmit a zone notification relative to itself to avoid nearby vehicles or pedestrians from colliding with Vehicle B 420.

It is important to note that while the examples illustrated may indicate a peer-to-peer configuration or peer-to-peer messaging, it may also use a managed communication network, multi-hop peer-to-peer system or any combination thereof. For example, Vehicle A 430 may communicate directly with the RSU 450 and the RSU 450 may transmit a message directly with Vehicle E 460, Vehicle C 40 and/or Pedestrian 470.

Vehicle A 430 may determine an issue that may affect a zone and notify the RSU 450. The RSU 450 may more specifically identify which device's (e.g. Vehicle C 440, Vehicle E 460 and Pedestrian 470) are within the zone and it may notify, either via a point-to-point message or broadcast message, that those devices may be affected by this issue.

In another example, Vehicle A 430 may identify that Vehicle B 420 has run a red light, so Vehicle A 430 may request that Vehicle B 420 stop. Vehicle B 120 may receive this message and stop in the intersection 410 to allow Vehicle E 460 and/or Pedestrian 470 proceed through the intersection from east to west. According to an aspect of the disclosure Vehicle B 420 may also go in reverse to allow Vehicle C 440 to proceed through the intersection 410. Vehicle B 420 may then proceed through the intersection 410 after those vehicles and pedestrians have crossed or when it is safe to do so.

In some circumstances, instead vehicle's self-monitoring or making these decisions for determine who to proceed, they may request that the RSU 450 make these determinations. For example, when Vehicle B 420 has been notified that it has run the red light (or it has determined this violation itself), it may request that the RSU 450 determine how the Vehicle B 420 should respond. The RSU 450 may indicate that the Vehicle B 420 should proceed through the intersection while the pedestrian 470, Vehicle E 460 and Vehicle C 440 wait. Alternatively, the RSU 450 may make Vehicle B 420 wait or back up so that Vehicle C 440, Vehicle E 460 and Pedestrian 470 can proceed through or parallel to the intersection 410.

FIG. 5 is an example process diagram illustrating vehicle platoon negotiation. At block 510, a device may identify one or more vehicle platoons in proximity to the device or it may identify one or more vehicles in proximity to it that may be eligible to be in platoon. The identification may be based on various criteria, such as capabilities of the platoon, destination of the platoon, duration for the platoon to stay together on the road, or any combination thereof. This information may be broadcasted by the platoon, may be requested by a vehicle that wishes to join the platoon, may receive this information from a server, may be part of the RTM or any combination thereof.

A device may identify which platoon it may attempt to join based on capabilities. For example, a device may determine there is a platoon that requires RF communications, autonomous driving, camera(s), radar(s) and ultrasonic sensor(s), and if the device or the co-located vehicle that includes the device has those capabilities then it may identify that are a potential platoon candidate. This may similarly be done if the device has at least a portion of the journey that is similar to the destination of the platoon or the duration where the platoon will have a similar journey to the device.

In another example, a device may identify one or more vehicles in proximity to itself that may be eligible to be part of a platoon. The device may identify that the nearby vehicles and the device will be on the same road for a particular duration, may have a similar destination or any combination thereof. The device may also need additional information, such as the nearby device's capabilities, driving modes, or any combination thereof. If a nearby device can only be manually driven or provide assistance information to the driver, then it may not meet the capabilities required to join or be a part of a platoon. In some circumstances, they may still be part of a platoon but the spacing from that particular vehicle and another vehicle may be increased to account for a human driver (this may similarly be adjusted based on the autonomous system response time and/or the device's sensor response time).

At block 520, the device may transmit one or more requests to join the identified one or more vehicle platoons. The one or more requests may indicate the device's capabilities, device's driving modes, destination, system response times, sensor response times, encryption keys, or any combination thereof.

The device's capabilities may indicate RF capabilities (e.g. dedicated short range communications (DSRC), cellular vehicle-to-everything (C-V2X), 5G C-V2X, dual sim dual standby, etc.), sensor capabilities (e.g. Radar(s), camera(s), LiDAR(s), GNSS, ultrasonic sensor(s)), or any combination thereof.

The capabilities may also indicate features or a more specific type of sensor for each sensor. For example, it may indicate real-time kinematic (RTK) for GNSS, dual band GNSS, long range radar, medium range radar, short range radar, depth camera, red/green/blue camera, etc.

The capabilities may also indicate the number of each sensor or sensor type and/or the placement of those sensors. For example, it may indicate there is a forward-facing camera and two side facing cameras for each side of the vehicle.

In one embodiment, the device capabilities may indicate the vehicle's make/model or other identification information. The receiving devices may use this information to lookup the device's capabilities.

Figure 6:
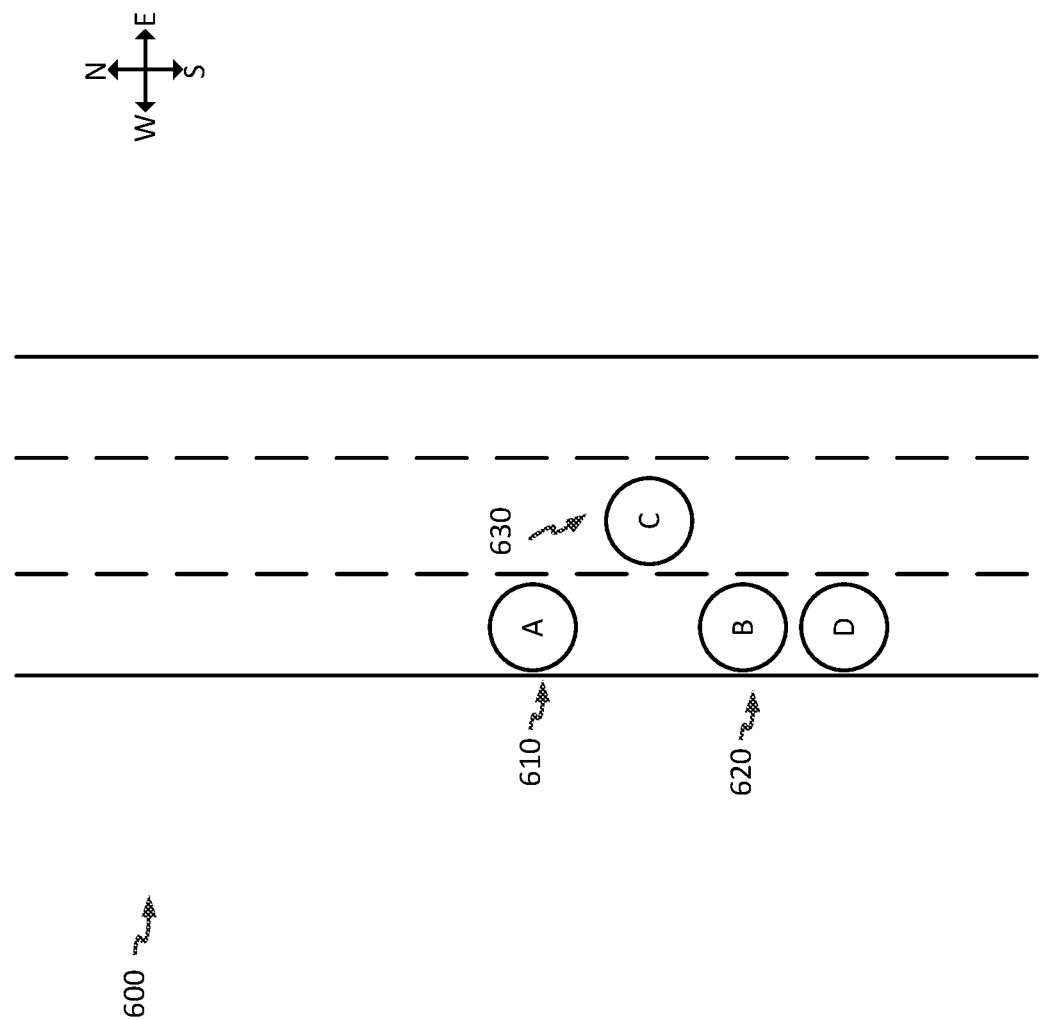
FIG. 6 is an example map of devices illustrating vehicle platoon negotiation.

As an example, as illustrated in FIG. 6, Vehicle C 630 may identify the platoon of Vehicle A 610, Vehicle B 620 and Vehicle D. Vehicle C 630 may request to join their platoon. This request may be one or more broadcast messages and/or one or more point-to-point messages.

At block 530, the device may receive one or more responses to the one or more requests. The responses may indicate that the device may join the platoon, a device may not join the platoon, a request for more information, platoon calibration information, or any combination thereof.

In one embodiment, the device may receive a request for more information. For example, the response may request response information by the autonomous system, braking information, acceleration information, sensor response information, gas/energy current levels, energy available storage capacity, or any combination thereof.

The response information by the autonomous system may indicate whether the spacing between vehicles is sufficient to avoid a potential accident, so if a platoon is operating with a particular spacing then the platoon may use that as a requirement and make sure the device can comply with that spacing requirement. This may similarly be done for the braking information, acceleration information and sensor response information.

The gas/energy current level may be used to evaluate whether the device will stay within the platoon or will need to remove itself from the platoon before reaching the predetermined break off point. If the device does not have sufficient gas/energy levels to make it to the predetermined break off point from the platoon, then the platoon may use that determine that the device should not be part of the platoon.

The energy/gas current level may also be used to determine placement within the platoon. For example, if the device does not have sufficient energy/gas levels to make it to the predetermined break off point for the device from the platoon, then the platoon may still allow the device to be apart of the platoon but it may have the device placed at the back of the platoon so it can break off earlier from the platoon so that it may obtain more gas/energy.

In one embodiment, the platoon may place the device in a space in proximity to another vehicle that is able to charge the device. For example, if another vehicle has the capability to charge a vehicle in proximity to it and have sufficient energy to do so, then the platoon may place the device that needs additional energy in proximity to that particular vehicle.

According to an aspect of the disclosure, the device's available energy capacity may be used to determine whether or not they can join the platoon or where they can join the platoon. For example, there may be vehicles that able to produce energy (e.g. solar panels, regenerative brakes, etc.) but they may their batteries may be full. In this circumstance, by adding vehicles that have additional energy capacity available, it allows the vehicles generating electricity to charge the vehicles with the additional energy capacity, so the entire system is more efficient rather than losing opportunities to generate electricity.

It is important to note that while these examples indicate that a platoon may be in the same lane, this is not required. A platoon may include vehicles that are in proximity to one another, such as side by side, front to back, combination of both, etc. For example, a vehicle platoon may have mostly members that are in the same lane, but another part of the vehicle platoon may include vehicles that are in close proximity to the other vehicles and may even have reduced spacing from what may be provided with the predetermined lanes (or even marked lanes).

The device may provide the additional requested information to the platoon for evaluation. This information may be provided to the head of the platoon, a section leader for a part of the platoon, the vehicles in proximity to the device, vehicles that potentially may occupy a space in front of the device or behind the device within the platoon, or any combination thereof.

The requests for additional information and responses to the request for additional information may be iterative and may happen until a definitive response is received of whether or not the vehicle can join the platoon.

In one embodiment, the device may receive a response indicating platoon calibration information. This may request that the device provide sensor information for a period of time, so the platoon can evaluate whether the device can join the platoon. For example, it may measure the response time from when it sends a request to the device to how long it takes for the device to perform a procedure (e.g. braking, acceleration, movement, etc.). The platoon may use this information to determine whether or not the device can join their platoon.

If a device receives a response that indicates it cannot join a platoon, it may negotiate with one or more other platoons or one or more other vehicles until it joins or creates a platoon.

If a device receives a response that it can join a platoon, the response message may also include where it can join the platoon, which capabilities of the vehicle that needs to be enabled, configuration information for the platoon or any combination thereof.

The positional information of where a device can join a platoon may include device identifiers (e.g. globally unique identifiers, proximity unique identifiers, etc.), one or more sets of device characteristics, or any combination thereof. For example, it may indicate the device may join in the space after the vehicle with a license plate "5LOF455" and before the "White Honda Pilot w/the EX trim".

The response may also indicate which capabilities to activate. For example, it may indicate that the vehicle's RF communication, ultrasonic sensors and long-range radar should be enabled. In one embodiment, it may specify which sensor(s) from a plurality of sensors of the same or similar type should be enabled. For example, it may indicate that the vehicle's front ultrasound sensors, the side cameras and the front long-range radar should be enabled.

The response may also indicate the periodicity of the sensors. For example, it may indicate that the device's side cameras should be at hundred percent duty cycle, but the long range radar should be at a fifty percent duty cycle. In some embodiment, the response may indicate a quasi-periodicity and/or on-demand requests. A member of the platoon may request that the device perform a particular sensor measurement, and this may be coordinated within the platoon. For example, a section leader of a platoon may instruct that the device and a second device to alternate who performs a radar measurement but requires that it is captured every second, and the section leader may also assign the device and a third device to alternate who captures front camera data but requires that it is captured every twenty seconds.

A platoon member may also provide instructions to other platoon members where the execution of the instructions is based on a trigger event. For example, a section leader may indicate that the device and the second device alternate a front camera capture every thirty seconds, but if the relative signal strength from RF communications between the device and the second device falls below a threshold then they both capture camera data every ten milliseconds.

The device may also receive configuration information for the platoon. The platoon may indicate communication channels, protocols, etc. that the device is to use. For example, it may indicate a first communication channel and power level that the device is to use with the vehicles that are immediately in front of them and/or immediately behind them. It may also provide a second communication channel and power level to vehicles outside of that range. It may also have a dedicated communication channel to use for emergency situations (e.g. hard stop, emergency maneuver, etc.).

At block 540, the device may perform one or more actions based on the received one or more responses. The device may maneuver into a space to be part of the platoon. In one embodiment, the device may already be in proximity to the platoon, so it may request configuration information (if such information is not provided in the response messages to the request to join the platoon) and after it has applied the configuration information it may notify the platoon it has joined it. According to an aspect of the disclosure, the device may transmit an acknowledgement message once it has joined the platoon once it is in proximity to the platoon or it has maneuvered into the designated spot within the platoon.

It is important to note that the device may be a co-located device within the vehicle, so the device may instruct the vehicle to perform these maneuvers or obtain sensor information from sensors embedded within the vehicle.

As illustrated in FIG. 6, Vehicle C 630 may receive a response from one or more vehicles in the platoon (e.g. Vehicle A 610, Vehicle B 620, Vehicle D). If the response indicates that Vehicle C 630 may join their platoon, it may send an acknowledgement message. It may stay in the same position it is in on FIG. 6 or it may move into the space between Vehicle A 610 and Vehicle B 620. In some circumstances, if Vehicle C 630 decided to stay in its current lane, Vehicle C 630 may adjust its lateral position so Vehicle C 630 is closer to Vehicles A 610 and Vehicle B 620 without being in the same lane but also not being entirely within the middle north bound lane.

Figure 7:
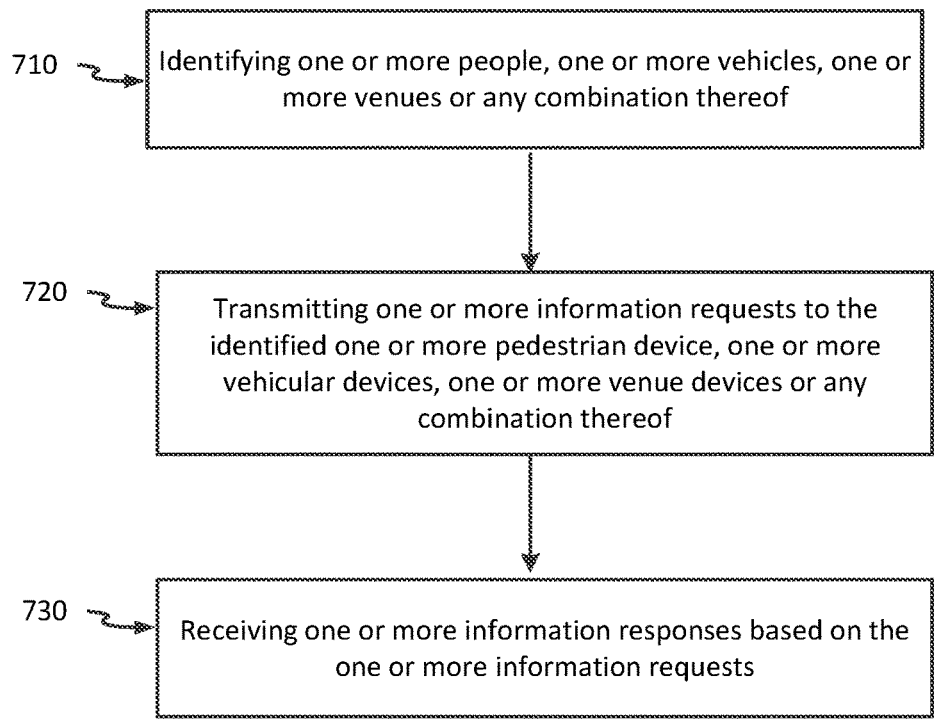
FIG. 7 is an example process diagram illustrating requesting information from nearby devices.

FIG. 7 shows a process diagram of requesting information from one or more pedestrian devices, one or more vehicular device, one or more venue devices or any combination thereof.

At block 710, a device (e.g. mobile device 100 and/or server 140) identifies one or more pedestrian devices, one or more vehicular devices, one or more venue devices or any combination thereof. The device may identify them based on the user input, safety, application(s), or any combination thereof. For example, a gaming application may identifying one or more devices that are in proximity to the device that have the same application. In another example, planning control function may identify one or more pedestrians in close proximity to the vehicle that may potentially interfere or collide with the vehicle, so this identification may be done so later coordinate with those pedestrians to determine who should proceed through an intersection or crosswalk. The identification may be done based on distance, time, relevance to a path a vehicle may be taking, etc. It may be done with latitude/longitude coordinates, video/image data, ultrasound, radar, LiDAR, etc.

The device may have application(s) loaded on it or a co-located device, and the device may receive requests from these application(s) either directly or through one or more intermediaries. For example, an application or a preconfigured use case of the device may request crowdsourcing of information about nearby venues.

The device may identify based on safety. For example, the device may identify a pedestrian that is about to be harmed (e.g. crossing a train track while a train is coming). Similarly, the device may identify a nearby device based on an amber alert-type system.

The device may also identify another nearby device based on user input. For example, a user may want to ask a question of a user of a nearby vehicle, such as asking them on a date, thinks to do in the vicinity, etc.

At block 720, the device may transmit one or more information requests to the identified one or more pedestrian devices, one or more vehicular devices, one or more venue devices or any combination thereof. The one or more information request may be generated based on user input, application(s), safety or any combination thereof. It may use the information provided during block 710 to generate this information request and/or it may request additional information from a second device that the device is communicated with (e.g. information request may be an iterative approach, so it may need to request information from the second device one or more times) when generating the information request.

For example, when crowdsourcing venue information it may query what information the one or more venue devices are able to provide and it may transmit a request based on the information that the venue device is able to provide. For example, the venue device may provide hours, location, deals, current occupancy levels, typical busy times, etc.

According to an aspect of the disclosure, some venues may not have devices that are able to response to these queries or may not have devices. In these circumstances, a device may request a nearby device that is closest to the venue to determine information about the venue. In some circumstances, a server 140 may request information from the device, because it is the closest to the venue. In either circumstance, the closest device may determine whether the lights are on, if the venue looks busy, etc. In one embodiment, any device that is able to determine whether the lights are on may be used, not necessarily the closest device. The device may be equipped with infrared sensors and it may be able to classify the number of people or approximate the number of people in the venue. The device may use their cameras along with a classifier (e.g. programmed classifier, ML classifier, etc.) to determine whether the lights are on. In one embodiment, the device may use its camera data, along with a classifier, to determine the number of vehicles in the parking lot to determine whether or not a venue is open. It is important to note while there may be instances that imply one classifier, it is intended to mean there may be one or more classifiers.

At block 730, the device may receive one or more information responses based on the one or more information requests. The information responses may be based on user input, preprogrammed responses, providing a notification to a user, etc.

For example, if the information request was to notify the user of an oncoming train, the information response may be transmitted after a notification is displayed (presumably to the user) and the response may be an acknowledgement message.

In another example, if the information request is asking information from a user in a nearby vehicle, the information response may include the user input by the user in the nearby vehicle (e.g. if the question is "will you go on a date with me", the response may be "Leave me alone creep").

In the example of querying a venue, the venue device may be preprogrammed to response to particular questions, such as hours, location, deals, etc.

In one embodiment, the device may perform one or more actions based on the one or more received information responses. The actions may include provide an acknowledgement message, displaying information to the user, providing the information to a third party (e.g. server) or any combination thereof.

Figure 8:
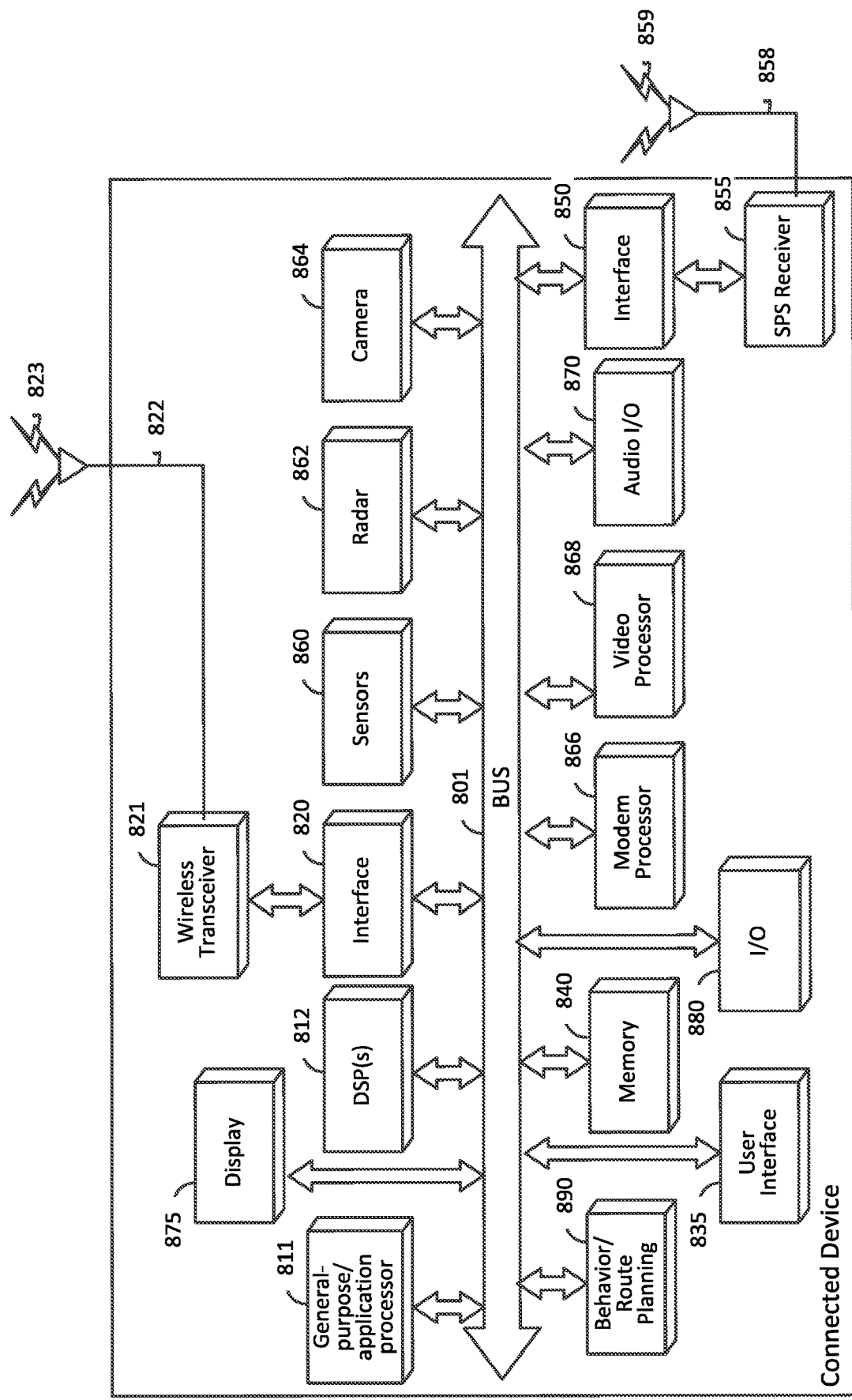
FIG. 8 is an example mobile device and the components within the mobile device in which aspects of the disclosure may be implemented.

FIG. 8 is a schematic diagram of a mobile device 800 according to an implementation. Mobile device 100 shown in FIG. 1 may comprise one or more features of mobile device 800 shown in FIG. 8. In certain implementations, mobile device 800 may comprise a wireless transceiver 821 which is capable of transmitting and receiving wireless signals 823 via wireless antenna 822 over a wireless communication network. Wireless transceiver 821 may be connected to bus 801 by a wireless transceiver bus interface 820. Wireless transceiver bus interface 820 may, in some implementations be at least partially integrated with wireless transceiver 821. Some implementations may include multiple wireless transceivers 821 and wireless antennas 822 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 821 may transmit signals on an uplink channel and receive signals on a downlink channel as discussed above.

The mobile device 800 may include a wired interface (not shown in FIG. 9), such as ethernet, coaxial cable, controller area network (CAN), etc.

Mobile device 800 may also comprise SPS receiver 855 capable of receiving and acquiring SPS signals 859 via SPS antenna 858 (which may be integrated with antenna 822 in some implementations). SPS receiver 855 may also process, in whole or in part, acquired SPS signals 859 for estimating a location of mobile device 800. In some implementations, general-purpose processor(s) 811, memory 840, digital signal processor(s) (DSP(s)) 812 and/or specialized processors (not shown) may also be utilized to process acquired SPS signals, in whole or in part, and/or calculate an estimated location of mobile device 800, in conjunction with SPS receiver 855. Storage of SPS or other signals (e.g., signals acquired from wireless transceiver 821) or storage of measurements of these signals for use in performing positioning operations may be performed in memory 840 or registers (not shown). General-purpose processor(s) 811, memory 840, DSP(s) 812 and/or specialized processors may provide or support a location engine for use in processing measurements to estimate a location of mobile device 800. In a particular implementation, all or portions of actions or operations set forth for process 200, 300, 500, and/or 700 may be executed by general-purpose processor(s) 811 or DSP(s) 812 based on machine-readable instructions stored in memory 840.

Also shown in FIG. 8, digital signal processor(s) (DSP(s)) 812 and general-purpose processor(s) 811 may be connected to memory 840 through bus 801. A particular bus interface (not shown) may be integrated with the DSP(s) 812, general-purpose processor(s) 811 and memory 840. In various implementations, functions may be performed in response to execution of one or more machine-readable instructions stored in memory 840 such as on a computer-readable storage medium, such as RAM, ROM, FLASH, or disc drive, just to name a few examples. The one or more instructions may be executable by general-purpose processor(s) 811, specialized processors, graphics processing unit(s) (GPU), neural processor(s) (NPU), AI accelerator(s), or DSP(s) 812. Memory 840 may comprise a non-transitory processor-readable memory and/or a computer-readable memory that stores software code (programming code, instructions, etc.) that are executable by processor(s) 811 and/or DSP(s) 812. The processor(s) 811 and/or the DSP(s) 812 may be used to perform various operations as described throughout the specification.

Also shown in FIG. 8, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general-purpose processor 811 in response to action from a user. Similarly, applications hosted on mobile device 800 may store analog or digital signals on memory 840 to present an output signal to a user. In another implementation, mobile device 800 may optionally include a dedicated audio input/output (I/O) device 870 comprising, for example, a dedicated speaker, microphone, digital to analog circuitry, analog to digital circuitry, amplifiers and/or gain control. Audio I/O 870 may also include ultrasound or any audio based positioning that can be used to determine the position, orientation or context of the mobile device 800. Audio I/O 870 may also be used to provide data via one or more audio signals to another source. It should be understood, however, that this is merely an example of how an audio I/O may be implemented in a mobile device, and that claimed subject matter is not limited in this respect.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one embodiment, additional processing, conditioning, encoding or compression of signals representing captured images may be performed at general purpose/application processor 811 or DSP(s) 812. Alternatively, a dedicated video processor 868 may perform conditioning, encoding, compression or manipulation of signals representing captured images. Additionally, video processor 868 may decode/decompress stored image data for presentation on a display device (not shown) on mobile device 800. The video processor 868, may be an image sensor processor, and may be capable of performing computer vision operations.

Camera device 864 may include image sensors. The image sensors may include cameras, charge coupled device (CCD) based devices, or Complementary Metal Oxide Semiconductor (CMOS) based devices, Lidar, computer vision devices, etc. on a vehicle, which may be used to obtain images of an environment around the vehicle. Image sensors, which may be still and/or video cameras, may capture a series of 2-Dimensional (2D) still and/or video image frames of an environment. In some embodiments, image sensors may take the form of a depth sensing camera, or may be coupled to depth sensors. The term "depth sensor" is used to refer to functional units that may be used to obtain depth information. In some embodiments, image sensors 232 may comprise Red-Green-Blue-Depth (RGBD) cameras, which may capture per-pixel depth (D) information when the depth sensor is enabled, in addition to color (RGB) images. In one embodiment, depth information may be obtained from stereo sensors such as a combination of an infra-red structured light projector and an infra-red camera registered to a RGB camera. In some embodiments, image sensors may be stereoscopic cameras capable of capturing 3 Dimensional (3D) images. For example, a depth sensor may form part of a passive stereo vision sensor, which may use two or more cameras to obtain depth information for a scene. The pixel coordinates of points common to both cameras in a captured scene may be used along with camera parameter information, camera pose information and/or triangulation techniques to obtain per-pixel depth information. In some embodiment, the image sensor may be capable of capturing infrared or other non-visible light (i.e. not visible to the human eye). In some embodiments, image sensor may include Lidar sensors, which may provide measurements to estimate the relative distance of objects. The camera 864 may also be capable of receiving visual light communication data by capturing optical measurements and demodulating to receive this data. The term "camera pose" or "image sensor pose" is also used to refer to the position and orientation of an image sensor on a subject vehicle.

Mobile device 800 may also comprise sensors 860 coupled to bus 801 which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by DSP(s) 812 or general-purpose application processor 811 in support of one or more applications such as, for example, applications directed to positioning or navigation operations. The sensors 860 may also include radar 862, which may be used to determine the distance between the device and another object. The sensors 860, SPS receiver 855, wireless transceiver 821, camera(s) 864, audio i/o 870, radar 862 or any combination thereof may be used determine one or more location measurements and/or a position location of the mobile device 800.

Mobile device 800 may comprise one or more displays 875 and/or one or more display controllers (not shown). The displays 875 and/or the display controllers may provide and/or display a user interface, visual alerts, metrics, and/or other visualizations. In one embodiment, the one or more displays 875 and/or display controllers may be integrated with the mobile device 800.

According to another aspect of the disclosure, the one or more displays 875 and/or display controllers may be external to the mobile device 800. The mobile device 800 may have one or more input and/or output ports (I/O) 880, through a wired or wireless interface, and may use the I/O to provide data to the external one or more displays 875 and/or display controller(s).

The I/O 880 may be used for other purposes as well, such as but not limited to obtaining data from a vehicle's onboard diagnostics, vehicle sensors, providing sensor information from the mobile device 800 to the external device, etc. The I/O 880 may be used to provide data, such as position information, to another processor and/or component, such as the behavior and/or route planning component 890.

The behavior and/or route planning component 890 may be one or more hardware components, software or any combination thereof. The behavior and/or route planning component 890 may also be part of one or more other components, such as but not limited to one or more general purpose/application processor 811, DSP 812, GPU, neural processor(s) (NPU), AI accelerator(s), microcontrollers, controllers, video processor(s) 868 or any combination thereof. The behavior and/or route planning component 890 may determine and/or adjust vehicle speed, position, orientation, maneuvers, route, etc. The behavior and/or route planning component 890 may trigger alerts to the user or operator of the vehicle and/or a remote party (e.g. third party, remote operator, owner of the vehicle, etc.) based on the determinations related to speed, position, orientation, maneuvers, route, etc. In one embodiment, the behavior and/or route planning component 890 may also perform one or more steps similar to those listed in FIG. 2, FIG. 3, FIG. 5, FIG. 7 and/or other parts of the specification.

The driving component, not shown in FIG. 8, may be one or more hardware components, software or any combination thereof. The driving component may directly control steering, accelerator, braking, and directionality (e.g. forward, reverse, etc.).

The behavior and/or route planning component 890, driving component, processor 811, GPU, DSP 812, video processor(s) 868 or other type of processor(s), memory 840, sensors 860, radar(s) 862, camera(s) 864, wireless transceiver 821 with modem processor 866, audio I/O 870, SPS receiver 855 or any combination thereof may obtain environment information in proximity to the first device, similar to block 210.

The behavior and/or route planning component 890, driving component, processor 811, GPU, DSP 812, video processor(s) 868 or other type of processor(s), memory 840, camera(s) 864, wireless transceiver 821 with modem processor 866, audio I/O 870, or any combination thereof receive one or more communication messages from a second device, wherein the one or more communication messages includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof, similar to block 220; determining, by the first device, whether the one or more communication messages are relevant to the first device based on the relevance criteria and the environment information, similar to block 230; and performing, by the first device, an operation in response to the determination of whether the one or more communication messages are relevant to the first device, similar to block 240.

The behavior and/or route planning component 890, driving component, processor 811, GPU, DSP 812, video processor(s) 868 or other type of processor(s), memory 840, sensors 860, radar(s) 862, camera(s) 864, wireless transceiver 821 with modem processor 866, audio I/O 870, SPS receiver 855 or any combination thereof may determine one or more issues or one or more intentions, similar to block 310.

The behavior and/or route planning component 890, driving component, processor 811, GPU, DSP 812, video processor(s) 868 or other type of processor(s), memory 840, wireless transceiver 821 with modem processor 866, audio I/O 870 or any combination thereof may determine whether to provide one or more direct notifications, one or more zone notifications or both, similar to block 320; may determine whether to provide one or more broadcast messages, one or more point-to-point messages or both, similar to block 330; and may transmit one or more notifications of one or more determined issues or intentions based on the determination of whether to provide one or more direct notification, one or more zone notifications or both and the determination of whether to provide one or more broadcast messages, one or more point-to-point messages or both, similar to block 340.

The behavior and/or route planning component 890, driving component, processor 811, GPU, DSP 812, video processor(s) 868 or other type of processor(s), memory 840, sensors 860, radar(s) 862, camera(s) 864, wireless transceiver 821 with modem processor 866, audio I/O 870, SPS receiver 855 or any combination thereof may identify one or more vehicle platoons, similar to block 510.

The behavior and/or route planning component 890, driving component, processor 811, GPU, DSP 812, video processor(s) 868 or other type of processor(s), memory 840, wireless transceiver 821 with modem processor 866, audio I/O 870 or any combination thereof may transmit one or more requests to join the identified one or more vehicle platoons, similar to block 520; may receive one or more responses to the one or more requests, similar to block 530; and may perform one or more actions based on the received one or more response, similar to block 540.

The behavior and/or route planning component 890, driving component, processor 811, GPU, DSP 812, video processor(s) 868 or other type of processor(s), memory 840, sensors 860, radar(s) 862, camera(s) 864, wireless transceiver 821 with modem processor 866, audio I/O 870, SPS receiver 855 or any combination thereof may identify one or more people, one or more vehicles, one or more venues or any combination thereof, similar to block 710.

The behavior and/or route planning component 890, driving component, processor 811, GPU, DSP 812, video processor(s) 868 or other type of processor(s), memory 840, wireless transceiver 821 with modem processor 866, audio I/O 870 or any combination thereof may transmit one or more information requests to the identified one or more pedestrian device, one or more vehicular devices, one or more venue devices or any combination thereof, similar to block 720; and may receive one or more information responses based on the one or more information requests, similar to block 730.

In a particular implementation, mobile device 800 may comprise a dedicated modem processor 866 capable of performing baseband processing of signals received and down converted at wireless transceiver 821 or SPS receiver 855. Similarly, modem processor 866 may perform baseband processing of signals to be upconverted for transmission by wireless transceiver 821. In alternative implementations, instead of having a dedicated modem processor, baseband processing may be performed by a general-purpose processor or DSP (e.g., general purpose/application processor 811 or DSP(s) 812). It should be understood, however, that these are merely examples of structures that may perform baseband processing, and that claimed subject matter is not limited in this respect.

Figure 9:
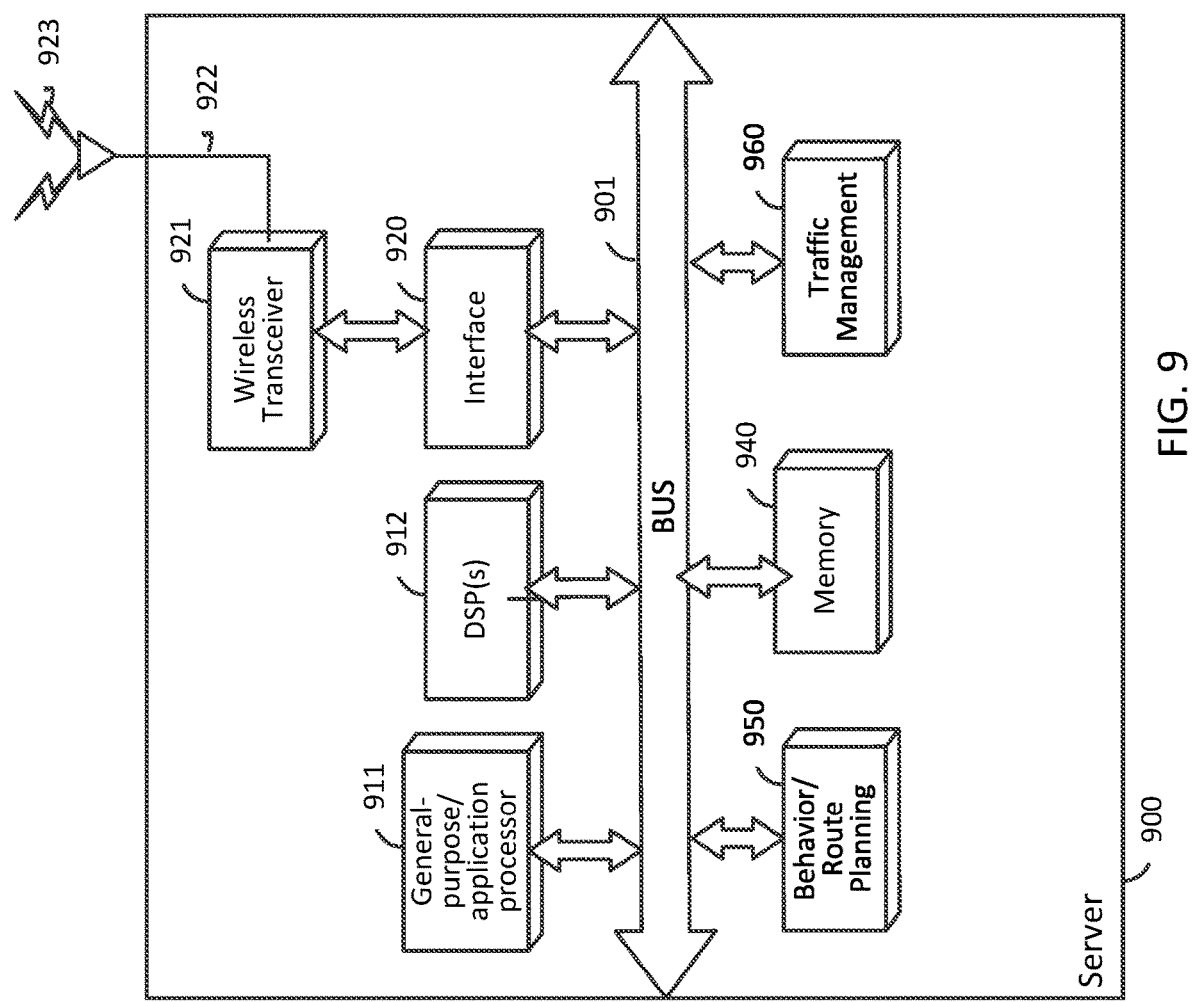
FIG. 9 is an example server and the components within the server in which aspects of the disclosure may be implemented.

FIG. 9 is a schematic diagram of a server 900 according to an implementation. Server 90 shown in FIG. 1 may comprise one or more features of server 900 shown in FIG. 9. In certain implementations, server 900 may comprise a wireless transceiver 921 which is capable of transmitting and receiving wireless signals 923 via wireless antenna 922 over a wireless communication network. Wireless transceiver 921 may be connected to bus 901 by a wireless transceiver bus interface 920. Wireless transceiver bus interface 920 may, in some implementations be at least partially integrated with wireless transceiver 921. Some implementations may include multiple wireless transceivers 921 and wireless antennas 922 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 921 may transmit signals on an uplink channel and receive signals on a downlink channel as discussed above.

It is important to note that even if not explicitly mentioned, any of the embodiments or examples described in the specification may use or be implemented with various machine learning/deep learning approaches.

The server 900 may include a wired interface (not shown in FIG. 9), such as ethernet, coaxial cable, etc.

Also shown in FIG. 9, digital signal processor(s) (DSP(s)) 912 and general-purpose processor(s) 911 may be connected to memory 940 through bus 901. A particular bus interface (not shown) may be integrated with the DSP(s) 912, general-purpose processor(s) 911 and memory 940. In various implementations, functions may be performed in response to execution of one or more machine-readable instructions stored in memory 940 such as on a computer-readable storage medium, such as RAM, ROM, FLASH, or disc drive, just to name a few examples. The one or more instructions may be executable by general-purpose processor(s) 911, specialized processors, or DSP(s) 912. Memory 940 may comprise a non-transitory processor-readable memory and/or a computer-readable memory that stores software code (programming code, instructions, etc.) that are executable by processor(s) 911 and/or DSP(s) 912. The processor(s) 911, specialized processor(s), graphics processing unit(s) (GPU), neural processor(s) (NPU), AI accelerator(s), microcontroller(s), controller(s) and/or the DSP(s) 912 may be used to perform various operations as described throughout the specification.

The behavior and/or route planning component 950 may be one or more hardware components, software or any combination thereof. The behavior and/or route planning component 950 may also be part of one or more other components, such as but not limited to one or more general purpose/application processor 911, DSP 912, GPU, neural processor(s) (NPU), AI accelerator(s), microcontrollers, controllers, video processor(s) or any combination thereof. The behavior and/or route planning component 950 may determine and/or adjust vehicle speed, position, orientation, maneuvers, route, etc. The behavior and/or route planning component 950 may trigger alerts to the user or operator of the vehicle and/or a remote party (e.g. third party, remote operator, owner of the vehicle, etc.) based on the determinations related to speed, position, orientation, maneuvers, route, etc. In one embodiment, the behavior and/or route planning component 950 may also perform one or more steps similar to those listed in FIG. 2, FIG. 3, FIG. 5, FIG. 7 and/or other parts of the specification.

The traffic management controller 960 may be one or more hardware components, software or any combination thereof. The behavior and/or route planning component 950 may also be part of one or more other components, such as but not limited to one or more general purpose/application processor 911, DSP 912, GPU, neural processor(s) (NPU), AI accelerator(s), microcontrollers, controllers, video processor(s), behavior/route planning 950 or any combination thereof. The traffic management controller 960 may use the RTM to determine optimized routes for vehicles and/or pedestrians based on current traffic patterns and/or predicted traffic patterns. The traffic management controller 960 may be used by traffic lights (e.g. physical traffic lights, virtual traffic lights, etc.) or operators of traffic lights to control the flow of traffic in a city, municipality, etc.

FIG. 9 does not show sensors, camera(s), radar(s), LiDAR, etc. but it may include these components. This is may be likely if the server 900 is an RSU or a network edge server.

The behavior and/or route planning component 950, processor 911, GPU, DSP 912, video processor(s), sensors, camera, radar, LiDAR or other type of processor(s), memory 940, wireless transceiver 921, wired interface or any combination thereof may obtain environment information in proximity to the first device, similar to block 210.

The behavior and/or route planning component 950, processor 911, GPU, DSP 912, video processor(s) or other type of processor(s), memory 940, wireless transceiver 921, wired interface or any combination thereof may receive one or more communication messages from a second device, wherein the one or more communication messages includes relevance criteria, wherein the relevance criteria indicates one or more devices, one or more sets of device characteristics, one or more lanes, one or more intersections or areas, one or more pedestrian paths or bicycle paths, one or more signal characteristics from the second device or any combination thereof, similar to block 220; determining, by the first device, whether the one or more communication messages are relevant to the first device based on the relevance criteria and the environment information, similar to block 230; and performing, by the first device, an operation in response to the determination of whether the one or more communication messages are relevant to the first device, similar to block 240.

The behavior and/or route planning component 950, processor 911, GPU, DSP 912, video processor(s) or other type of processor(s), memory 940, wireless transceiver 921, wired interface or any combination thereof may determine one or more issues or one or more intentions, similar to block 310; may determine whether to provide one or more direct notifications, one or more zone notifications or both, similar to block 320; may determine whether to provide one or more broadcast messages, one or more point-to-point messages or both, similar to block 330; and may transmit one or more notifications of one or more determined issues or intentions based on the determination of whether to provide one or more direct notification, one or more zone notifications or both and the determination of whether to provide one or more broadcast messages, one or more point-to-point messages or both, similar to block 340; may identify one or more vehicle platoons, similar to block 510; may transmit one or more requests to join the identified one or more vehicle platoons, similar to block 520; may receive one or more responses to the one or more requests, similar to block 530; and may perform one or more actions based on the received one or more response, similar to block 540; may identify one or more people, one or more vehicles, one or more venues or any combination thereof, similar to block 710; may transmit one or more information requests to the identified one or more pedestrian device, one or more vehicular devices, one or more venue devices or any combination thereof, similar to block 720; and may receive one or more information responses based on the one or more information requests, similar to block 730.

Discussions throughout the specification include examples and/or embodiments that may be combined in various ways even if not specifically discussed in that particular combination.

Discussions of coupling between components in this specification do not require the components to be directly coupled. These components may be coupled directly or through one or more intermediaries. Additionally, coupling does not require they be directly attached, but it may also include electrically coupled, optically coupled, communicatively coupled or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of operating a first device, the method comprising:
   obtaining, by the first device, environment information in proximity to the first device;
   receiving, by the first device, one or more communication messages from a second device, wherein the one or more communication messages include relevance criteria for whom the messages are intended, wherein the relevance criteria comprises: one or more devices, one or more sets of device characteristics, one or more lanes, one or more intersections or areas, one or more pedestrian paths or bicycle paths, one or more signal characteristics from the second device or any combination thereof, wherein the one or more communication messages are associated with actions of a third device;
   determining, by the first device, whether the one or more communication messages are relevant to the first device based on the relevance criteria and the environment information; and performing, by the first device, an operation in response to the determination of whether the one or more communication messages are relevant to the first device.

2. The method of claim 1, wherein the environment information comprises one or more images of an environment in proximity to the first device, a real-world traffic model (RTM) or any combination thereof.

3. The method of claim 1, further comprising:
obtaining one or more device characteristics corresponding to the first device; and
determining whether the one or more communication messages are relevant to the first device is further based on the first device characteristics and the one or more sets of device characteristics.

4. The method of claim 1, further comprising:
in response to the determination of whether the one or more communication messages are relevant to the first device, transmitting an acknowledgement message to the second device, wherein the acknowledgement message indicates that the first device has received the one or more communication messages and indicates whether the one or more communication messages are relevant to the first device.

5. The method of claim 1, the method further comprising:
determining whether the first device is to coordinate with the second device based on one or more device characteristics of the second device from the one or more sets of device characteristics and the environment information.

6. The method of claim 5, wherein the determining whether the first device is to
coordinate with the second device based on the one or more device characteristics of the second device and the environment information further comprises:
transmitting one or more requests to the second device, wherein the one or more requests indicate the second device to perform an action, capture one or more images of the first device or the third device from the second device, or any combination thereof; and
determining whether the second device is a non-spoofed device based on a response to the one or more requests.

7. The method of claim 5, further comprising: in response to the determination that the first device is to coordinate with the second device, determining whether the first device should perform a vehicular maneuver based on the one or more communication messages.

8. The method of claim 1, wherein the one or more communication messages include one or more intentions of the second device, one or more actions to be performed or requested to be performed by the second device, or any combination thereof.

9. The method of claim 1, further comprising:
in response to the determination that the one or more communication messages are relevant to the first device, setting a pertinence level associated with the second device to a higher level.

10. The method of claim 6, further comprising:
transmitting a second set of one or more communication messages, wherein the second set of one or more communication messages indicates one or more coordinated driving actions to be performed by the second device, to be performed by the first device or both.

11. The method of claim 1, wherein the environment information comprises one or more images; and
wherein determining whether the one or more communication messages are relevant to the first device based on the relevance criteria and the environment information further comprises:
determining whether the first device is in an area indicated in the relevance criteria of the one or more communication messages based on the one or more images;
in response to the determination that the first device is in the area indicated by the relevance criteria, determining whether the first device should perform a vehicular maneuver based on the one or more communication messages.

12. A first device comprising:
one or more memory;
one or more transceivers;
one or more processors, wherein the one or more processors are communicatively coupled to the one or more memory and the one or more transceivers, wherein the one or more processors configured to:
obtain environment information in proximity to the first device;
receive, via the one or more transceivers, one or more communication messages from a second device, wherein the one or more communication messages include relevance criteria for whom the messages are intended, wherein the relevance criteria comprises: one or more devices, one or more sets of device characteristics, one or more lanes, one or more intersections or areas, one or more pedestrian paths or bicycle paths, one or more signal characteristics from the second device or any combination thereof, wherein the one or more communication messages are associated with actions of a third device;
determine whether the one or more communication messages are relevant to the first device based on the relevance criteria and the environment information; and
perform an operation in response to the determination of whether the one or more communication messages are relevant to the first device.

13. The first device of claim 12, wherein the environment information comprises one or more images of an environment in proximity to the first device, a real-world traffic model (RTM) or any combination thereof.

14. The first device of claim 12, the one or more processors are further configured to:
obtain one or more device characteristics corresponding to the first device; and
determine whether the one or more communication messages are relevant to the first device is further based on the first device characteristics and the one or more sets of device characteristics.

15. The first device of claim 12, the one or more processors are further configured to:
in response to the determination of whether the one or more communication messages are relevant to the first device, transmit an acknowledgement message to the second device, wherein the acknowledgement message indicates that the first device has received the one or more communication messages and indicates whether the one or more communication messages are relevant to the first device.

16. The first device of claim 12, the one or more processors are configured to determine whether the first device is to coordinate with the second device based on one or more device characteristics of the second device from the one or more sets of device characteristics and the environment information.

17. The first device of claim 16, wherein the one or more processors configured to determine whether the first device is to coordinate with the second device based on the one or more device characteristics of the second device and the environment information further comprises the one or more processors configured to:
transmit one or more requests to the second device, wherein the one or more requests indicate the second device to perform an action, capture one or more images of the first device or the third device from the second device, or any combination thereof; and
determine whether the second device is a non-spoofed device based on a response to the one or more requests.

18. The first device of claim 16, further comprising the one or more processors configured to: in response to the determination that the first device is to coordinate with the second device, determine whether the first device should perform a vehicular maneuver based on the one or more communication messages.

19. The first device of claim 12, wherein the one or more communication messages include one or more intentions of the second device, one or more actions to be performed or requested to be performed by the second device, or any combination thereof.

20. The first device of claim 12, further comprising the one or more processors configured to:
in response to the determination that the one or more communication messages are relevant to the first device, set a pertinence level associated with the second device to a higher level.

21. The first device of claim 16, further comprising the one or more processors configured to:
transmit a second set of one or more communication messages, wherein the second set of one or more communication messages indicates one or more coordinated driving actions to be performed by the second device, to be performed by the first device or both.

22. The first device of claim 12, wherein the environment information comprises one or more images; and wherein the one or more processors further configured to determine whether the one or more communication messages are relevant to the first device based on the relevance criteria and the environment information further comprises:
the one or more processors further configured to:
determine whether the first device is in an area indicated in the relevance criteria of the one or more communication messages based on the one or more images;
in response to the determination that the first device is in the area indicated by the relevance criteria, determine whether the first device should perform a vehicular maneuver based on the one or more communication messages.

23. A first device comprising:
means for obtaining environment information in proximity to the first device;
means for receiving one or more communication messages from a second device, wherein the one or more communication messages includes relevance criteria for whom the messages are intended, wherein the relevance criteria comprises: one or more devices, one or more sets of device characteristics, one or more lanes, one or more intersections or areas, one or more pedestrian paths or bicycle paths, one or more signal characteristics from the second device or any combination thereof, wherein the one or more communication messages are associated with actions of a third device;
means for determining whether the one or more communication messages are relevant to the first device based on the relevance criteria and the environment information; and
means for performing an operation in response to the determination of whether the one or more communication messages are relevant to the first device.

24. The first device of claim 23, wherein the environment information comprises one or more images of an environment in proximity to the first device, a real-world traffic model (RTM) or any combination thereof.

25. The first device of claim 23, the first device further comprising:
means for obtaining one or more device characteristics corresponding to the first device; and
means for determining whether the one or more communication messages are relevant to the first device is further based on the first device characteristics and the one or more sets of device characteristics.

26. A non-transitory computer-readable medium for operating a first device, the first device comprising processor-executable program code configured to cause one or more processors to:
obtain environment information in proximity to the first device;
receive one or more communication messages from a second device, wherein the one or more communication messages includes relevance criteria for whom the messages are intended, wherein the relevance criteria comprises: one or more devices, one or more sets of device characteristics, one or more lanes, one or more intersections or areas, one or more pedestrian paths or bicycle paths, one or more signal characteristics from the second device or any combination thereof, wherein the one or more communication messages are associated with actions of a third device;
determine whether the one or more communication messages are relevant to the first device based on the relevance criteria and the environment information; and
perform, by the first device, an operation in response to the determination of whether the one or more communication messages are relevant to the first device.

27. The non-transitory computer-readable medium of claim 26, wherein the environment information comprises one or more images of an environment in proximity to the first device, a real-world traffic model (RTM) or any combination thereof.

28. The non-transitory computer-readable medium of claim 26, the non-transitory computer-readable medium further comprising processor-executable program code configured to cause the one or more processors to:
obtain one or more device characteristics corresponding to the first device; and
determine whether the one or more communication messages are relevant to the first device is further based on the first device characteristics and the one or more sets of device characteristics.

* * * * *